US012789492B2

(12) United States Patent
Larsson

(10) Patent No.: US 12,789,492 B2

(45) **Date of Patent: *Nov. 10, 2026**

(54) CELLULOSE PRODUCT TOGGLE PRESSING MODULE AND METHOD FOR USING THE SAME

(71) Applicant: PulPac AB, Västra Frölunda (SE)

(72) Inventor: Ove Larsson, Västra Frölunda (SE)

(73) Assignee: PULPAC AB, Västra Frölunda (SE)

( * ) Notice: Subject to any disclaimer, the term of this patent is extended or adjusted under 35 U.S.C. 154(b) by 173 days.

This patent is subject to a terminal disclaimer.

(21) Appl. No.: 18/287,904

(22) PCT Filed: Apr. 15, 2021

(86) PCT No.: PCT/EP2021/059810

§ 371 (c)(1),
(2) Date: Oct. 23, 2023

(87) PCT Pub. No.: WO2022/218530

PCT Pub. Date: Oct. 20, 2022

(65) Prior Publication Data

US 2024/0278521 A1 Aug. 22, 2024

(51) Int. Cl.

*B30B 1/10* (2006.01)
*B30B 11/04* (2006.01)
(Continued)

(52) U.S. Cl.

CPC ................ *B30B 1/10* (2013.01); *B30B 11/04* (2013.01); *B30B 15/0094* (2013.01); *B30B 15/148* (2013.01); *B30B 15/302* (2013.01)

(58) Field of Classification Search

CPC .............. B30B 15/002; B30B 15/0029; B30B 15/0035; B30B 15/065; B29C 43/02; B29C 43/52; B29C 43/58; B31F 1/0077

See application file for complete search history.

(56) References Cited

U.S. PATENT DOCUMENTS 5,001,975 A * 3/1991 Finden .................... B30B 15/34 100/319
5,643,384 A 7/1997 Okabe
(Continued)

FOREIGN PATENT DOCUMENTS

CN 1182670 A 5/1998
CN 109311547 A 2/2019
(Continued)

OTHER PUBLICATIONS

Office Action mailed Nov. 5, 2024 for Japanese Patent Application No. 2023-562982, 13 pages (includes English translation).
(Continued)

*Primary Examiner* — Thu Khanh T. Nguyen

(74) *Attorney, Agent, or Firm* — Sage Patent Group

(57) ABSTRACT

A cellulose product toggle pressing module for forming non-flat cellulose products from an air-formed cellulose blank structure. The toggle pressing module includes a toggle press including pressing member movably arranged in a pressing direction, a toggle-mechanism connected to the pressing member, a pressing actuator arrangement connected to the toggle-mechanism, and an electronic control system operatively connected to the pressing actuator arrangement. The toggle pressing module includes a forming mold including a moveable first mold part attached to the pressing member and a second mold part. The electronic control system is configured for controlling operation of the pressing actuator arrangement for driving the pressing member using the toggle-mechanism in the pressing direction and forming the non-flat cellulose product from the cellulose blank structure by pressing the first mold part against the second mold part. Furthermore, the toggle press is installed with the pressing direction of the pressing member arranged primarily in a horizontal direction.

11 Claims, 14 Drawing Sheets

(51) Int. Cl.
*B30B 15/00* (2006.01)
*B30B 15/14* (2006.01)
*B30B 15/30* (2006.01)

(56) References Cited

U.S. PATENT DOCUMENTS

| | | | | |
|---|---|---|---|---|
| 2002/0182283 | A1* | 12/2002 | Gallagher | B29C 43/18 425/375 |
| 2007/0065531 | A1 | 3/2007 | Engleder | |
| 2016/0347017 | A1* | 12/2016 | Riemer | B30B 15/0035 |
| 2021/0069942 | A1* | 3/2021 | Larsson | B29C 51/004 |

FOREIGN PATENT DOCUMENTS

| | | | |
|---|---|---|---|
| CN | 109415131 | A | 3/2019 |
| EP | 3199322 | A1 | 8/2017 |
| EP | 3381645 | A1 | 10/2018 |
| GB | 675652 | A | 7/1952 |
| JP | H8-118083 | A | 5/1996 |
| JP | H10-235757 | A | 9/1998 |
| JP | 2001-524403 | A | 12/2001 |
| JP | 2002-172592 | A | 6/2002 |
| JP | 2011-189728 | A | 9/2011 |
| JP | 2019-513597 | A | 5/2019 |
| SE | 1750313 | A1 | 9/2018 |
| SE | 543410 | C2 | 1/2021 |
| WO | WO-2017/160218 | A1 | 9/2017 |
| WO | WO-2021/001276 | A1 | 1/2021 |

OTHER PUBLICATIONS

Communication Pursuant to Article 94(3) EPC mailed Oct. 28, 2024 for European Patent Application No. 21720211.8, 6 pages.

International Search Report and Written Opinion, International Application No. PCT/EP2021/059810, mailed Jan. 4, 2022.

International Search Report and Written Opinion, International Application No. PCT/EP2022/059512, mailed Jul. 21, 2022.

International Search Report and Written Opinion, International Application No. PCT/EP2021/059811, mailed Jan. 19, 2022.

Office Action, Chinese Patent Application No. 202180096969.1, mailed May 18, 2026, 13 pages.

Huang, Peng; "Development of Control System for Knuckle Press Numerical Control Machine"; Machine Tools and Hydraulics, vol. 37, No. 6; Jun. 5, 2009; 3 pages (English Abstract provided).

* cited by examiner

CELLULOSE PRODUCT TOGGLE PRESSING MODULE AND METHOD FOR USING THE SAME

TECHNICAL FIELD

The present disclosure relates to a cellulose product toggle pressing module for forming non-flat cellulose products from an air-formed cellulose blank structure. The disclosure further relates to a method for forming non-flat cellulose products from an air-formed cellulose blank structure using a cellulose product toggle pressing module.

The cellulose product toggle pressing module according to the disclosure will be described primarily in relation to an example cellulose product forming unit having integrated fiber separating module, cellulose blank air-forming module, etc., but cellulose product toggle pressing module and associated method for using the same is not limited to this specific implementation and may alternatively be implemented and used in many other types of cellulose products manufacturing systems.

BACKGROUND

Cellulose fibers are often used as raw material for producing or manufacturing products. Products formed of cellulose fibers can be used in many different situations where there is a need for having sustainable products. A wide range of products can be produced from cellulose fibers and a few examples are disposable plates and cups, cutlery, lids, bottle caps, coffee pods, and packaging materials.

Forming molds are commonly used when manufacturing cellulose products from cellulose fiber raw materials, and traditionally the cellulose products are wet-formed. A material commonly used for wet-forming cellulose fiber products is wet molded pulp. Wet molded pulp has the advantage of being considered as a sustainable packaging material, since it is produced from biomaterials and can be recycled after use. Consequently, wet molded pulp has been quickly increasing in popularity for different applications. Wet molded pulp articles are generally formed by immersing a suction forming mold into a liquid or semi liquid pulp suspension or slurry comprising cellulose fibers, and when suction is applied, a body of pulp is formed with the shape of the desired product by fiber deposition onto the forming mold. With all wet-forming techniques, there is a need for drying of the wet molded product, where the drying is a very time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is the forming of cellulose fibers in a dry-forming process, without using wet-forming. Instead of forming the cellulose products from a liquid or semi liquid pulp suspension or slurry, an air-formed cellulose blank structure is used. The air-formed cellulose blank structure is inserted into forming molds and during the forming of the cellulose products the cellulose blank structure is subjected to a high forming pressure and a high forming temperature in the forming molds.

Manufacturing of cellulose products by compression molding of an air-formed cellulose blank structure may be performed in production lines or product forming units. The manufacturing equipment commonly includes a pressing module comprising the forming molds. Other modules and components are arranged in connection to the pressing module, such as for example feeding modules, buffering modules, and blank dry forming modules. The pressing module is normally a high capacity pressing module, such as large hydraulic or servo powered pressing machines, which may be used for forming other materials such as steel plates, since these modules are available as stand-alone off-the shelf machinery.

One drawback of using a standard pressing module developed for general purposes is the high cost typically associated with a conventional high capacity hydraulic or servo powered pressing machine, as well as problems caused by their large size and weight in terms of shipping, installation, maintenance and factory size.

Moreover, the customer normally investing in cellulose product forming units is called converter and has typically no or little skill in the engineering required to develop and integrate the necessary modules for a complete cellulose product forming unit, and there is thus a desire among converters to be able to purchase complete, fully integrated, standardized production forming units, that may be easily shipped, installed and made to run.

There is thus a need for a low-cost, compact and less heavy cellulose product pressing module for forming non-flat cellulose products from an air-formed cellulose blank structure, as well as a method for forming non-flat cellulose products from an air-formed cellulose blank structure using such a cellulose product pressing module. There is also a need for a cellulose product pressing module that enables development and manufacturing of low-cost, compact, fully integrated, standardized cellulose product forming units that may be easily shipped, installed and made to run.

SUMMARY

An object of the present disclosure is to provide a cellulose product pressing module for forming non-flat cellulose products from an air-formed cellulose blank structure, as well as an associated method for forming non-flat cellulose us blank structure by pressing the first mold part against the second mold part, and the toggle press is installed with, or arranged for being installed with, the pressing direction of the pressing member arranged primarily in a horizontal direction, specifically with the pressing direction of the pressing member arranged within 20 degrees from the horizontal direction, and more specifically with the pressing direction in parallel with the horizontal direction.

According to a second aspect of the present disclosure, there is provided a method for forming non-flat cellulose products from an air-formed cellulose blank structure. The method comprises providing a cellulose product toggle pressing module having a toggle press and a forming mold. The toggle press includes a pressing member movably arranged in a pressing direction, a toggle-mechanism connected to the pressing member, a pressing actuator arrangement connected to the toggle-mechanism, and an electronic control system operatively connected to the pressing actuator arrangement, and the forming mold includes a moveable first mold part attached to the pressing member and a second mold part. The method further comprises installing the toggle press with the pressing direction of the pressing member arranged primarily in a horizontal direction, specifically with the pressing direction of the pressing member arranged within 20 degrees from the horizontal direction, and more specifically with the pressing direction in parallel with the horizontal direction. The method further comprises feeding an air-formed cellulose blank structure into a pressing area defined by the first and second, spaced apart, mold parts, and controlling operation of the pressing actuator arrangement by means of the electronic control system for driving the pressing member using the toggle-mechanism in the pressing direction and forming the non-flat cellulose product from the air-formed cellulose blank structure by pressing the first mold part against the second mold part.

Toggle mechanism clamps are well known in the field of injection molding, where for example a plastic material in a liquid phase is injected with high pressure into a cavity formed by a closed mold. In the technical field of injection molding, the purpose of the toggle mechanism clamp is merely to close the injection mold parts and to exert a sufficient clamping force to avoid separation of the mold parts due to internal injection pressure within the mold.

However, toggle mechanism is less commonly used for compression molding applications, in which the pressure level typically is a relevant parameter that may have to be controlled with a certain accuracy, partly because control of pressing force is more complicated due to the exponential amplification character of the toggle mechanism, and partly because the resulting pressing force cannot be easily determined with good accuracy. For example, calculation of the pressing force requires not only information about input pressing force generated by a pressing actuator arrangement, but also information about toggle mechanism angular position for determining amplification level.

On the other hand, toggle presses have, compared with conventional high capacity hydraulic or servo presses, the advantage of being relatively compact and low-cost due to the low input pressing force requirement. In other words, a relatively small capacity actuator, such as a small capacity hydraulic or pneumatic linear actuator, i.e. cylinder-piston arrangement, or low power electric motor driven ball-screw linear actuator, may be sufficient for driving the toggle mechanism and thereby generating a significantly larger pressing force.

Moreover, the toggle press also has an inherent highly beneficial speed-force characteristic that enables significant reduction in cycle time of the cellulose product forming cycle, compared with conventional high capacity hydraulic or servo presses. Specifically, the inherent force amplification characteristic of the toggle mechanism results in a relatively fast speed of the pressing member during an initial cycle time, starting from the standby position, while the speed is gradually reduced when approaching the maximal stroke state of the toggle mechanism in benefit for increased maximal pressing force. Hence, the initial motion of the pressing member is associated with high speed and low maximal pressing force, and motion of the pressing member during the actual pressing action is associated with low speed and high maximal pressing force.

Furthermore, the compact size and low weight of the toggle press simplifies installation and orientation of the toggle press in a non-vertical position.

In fact, assembling and building the toggle press such that the pressing direction of the pressing member is arranged primarily in a horizontal direction is particularly advantageous for compression molding of non-flat cellulose products from an air-formed cellulose blank structure, because it enables development of a highly compact cellulose product forming unit with integrated pressing module.

In particular, the compact size and low weight of the toggle press enables development of a very compact, complete, fully integrated, standardized cellulose product forming unit, that may be easily shipped, installed and made to run, and the low cost for a toggle press helps keeping the total cost for the cellulose product forming unit at a low level.

In addition, the primarily horizontal orientation of the toggle press enables low build height of the cellulose product forming unit, and a non-straight material flow of a continuous air-formed cellulose blank structure from a blank dry-forming module to the pressing module. A non-straight material flow, e.g. routing of a continuous air-formed cellulose blank structure in a first direction, such as for example upwards and subsequently in a second direction, such as for example downwards, generally enables development and manufacturing of a more compact cellulose product forming unit. Since a web of cellulose fiber material is typically supplied to the pressing module at about right angles to the pressing direction of the pressing module, a primarily horizontal orientation of the toggle press is typically associated with a primarily vertically arranged supply flow of the cellulose blank structure Consequently, it is clear that a primarily horizontally arranged pressing module is highly beneficial when developing a compact cellulose product forming unit having a non-straight material flow of an air-formed cellulose blank structure from a blank dry-forming module to the pressing module.

Further advantages are achieved by implementing one or several of the features of the dependent claims. For example, in some example embodiments, which may be combined with any one or more of the above-described embodiments, the toggle press further includes a pressing force indicating arrangement, wherein the electronic control system is operatively connected to the pressing force indicating arrangement and configured to control operation of the pressing actuator arrangement based on pressing force indicating feedback information received from the pressing force indicating arrangement. Thereby, better control of the pressing operation may be accomplished.

In some example embodiments, which may be combined with any one or more of the above-described embodiments, the toggle press further includes a front structure and a rear structure, wherein the toggle-mechanism is connected also to the rear structure, and wherein the second mold part is attached to the front structure. This enables a compact and cost-efficient pressing module.

In some example embodiments, the second mold part is a stationary, i.e. a stationary second mold part that is attached to the front structure. This generally enables a less complex and most cost-efficient design of the toggle-press.

In some example embodiments, which may be combined with any one or more of the above-described embodiments, the toggle press comprises a rigid frame structure defined by the front structure, the rear structure and an intermediate linear guiding arrangement that connects the front structure with the rear structure, wherein the pressing member is movably attached to the linear guiding arrangement and moveable in the pressing direction. This enables a compact and cost-efficient pressing module.

In some example embodiments, which may be combined with any one or more of the above-described embodiments, the toggle press further includes a feeding device for feeding the air-formed cellulose blank structure into a pressing area located between the first and second mold parts, wherein the feeding device is arranged for feeding the air-formed cellulose blank structure primarily vertically downwards into the pressing area, specifically for feeding the air-formed cellulose blank structure downwards with an angle of less than 20 degrees from a vertical direction into the pressing area, and more specifically for feeding the air-formed cellulose blank structure vertically downwards into the pressing area. The primarily vertically oriented feeding device enables simplified feeding into a pressing area of the forming mold.

In some example embodiments, which may be combined with any one or more of the above-described embodiments, the feeding device for feeding the air-formed cellulose blank structure into the pressing area includes an elongated vacuum belt feeder, and wherein the elongated vacuum belt feeder is arranged primarily in a vertical direction, specifically arranged with a direction of elongation within 20 degrees from the vertical direction, and more specifically arranged in parallel with the vertical direction. This enables a compact and cost-efficient pressing module.

In some example embodiments, which may be combined with any one or more of the above-described embodiments, the electronic control system is configured for obtaining pressing force indicating feedback information from the pressing force indicating arrangement, and controlling operation of the pressing actuator arrangement: for stopping an ongoing pressing motion of the pressing member when a value of a parameter derived from or associated with the pressing force indicating feedback information is at predetermined threshold value or within a predetermined range; or using a feedback controller having a parameter associated with the pressing force indicating feedback information as feedback process variable. Thereby, the resulting pressure applied to the cellulose blank structure for forming the cellulose product may be relatively well controlled, such that under or over pressure is avoided In some example embodiments, which may be combined with any one or more of the above-described embodiments, the pressing force indicating arrangement is a pressing member position detection arrangement, wherein the pressing force indicating feedback information obtained from the pressing member position detection arrangement represents a position of the pressing member or a mold gap between the first and second mold parts, and the electronic control system is configured for controlling operation of the pressing actuator arrangement: for stopping an ongoing pressing motion of the pressing member when a detected position of the pressing member or a mold gap between the first and second mold parts is at a predetermined threshold value or within a predetermined range; or using a feedback controller having a parameter associated with the pressing force indicating feedback information as feedback process variable. Knowledge of the position of the pressing member may be used for reasonably accurately estimating the press force based on knowledge of the press force of the pressing actuator arrangement, and knowledge of the position of the pressing member may also be used for determining the mold gap, which also may be used for reasonably accurately determining the press force.

In some example embodiments, which may be combined with any one or more of the above-described embodiments, the pressing force indicating arrangement is a pressing force detection arrangement, wherein the pressing force indicating feedback information obtained from the pressing force detection arrangement represents a pressing force of the pressing member, and the electronic control system is configured for controlling operation of the pressing actuator arrangement: for stopping an ongoing pressing motion of the pressing member when a detected pressing force of the pressing member is equal to or exceeds a predetermined threshold value; or using a feedback controller having a parameter associated with the pressing force indicating feedback information as feedback process variable. Knowledge of the press force enables the system to stop the press motion at a suitable position that corresponds to a target press force.

In some example embodiments, which may be combined with any one or more of the above-described embodiments, the toggle press includes a front structure and a rear structure, wherein the toggle-mechanism is connected to the rear structure, wherein the second mold part is attached to the front structure, and wherein the toggle press further includes a mechanical adjustment mechanism for enabling adjustment of a distance between the front structure and rear structure in the pressing direction, and an adjustment actuator arrangement configured for driving the mechanical adjustment mechanism. Thereby, the operating position of the toggle press may be adjusted to fit the specific characteristic of the cellulose blank structure and forming mold shape.

In some example embodiments, which may be combined with any one or more of the above-described embodiments, the toggle press further includes a pressing force indicating arrangement, wherein the electronic control system is operatively connected to the pressing force indicating arrangement, and wherein the control system is configured for controlling operation of the adjustment actuator arrangement, based on pressing force indicating feedback information received from the pressing force indicating arrangement, for adjusting the distance between the front structure and rear structure in the pressing direction, during a time period between consecutive pressing actions. Thereby, the operating position of the toggle press may be adjusted to fit the specific characteristic of the cellulose blank structure and forming mold shape.

In some example embodiments, which may be combined with any one or more of the above-described embodiments, the electronic control system is configured for controlling operation of the adjustment actuator arrangement, based on pressing force indicating feedback information received from the pressing force indicating arrangement, for adjusting the distance between the front structure and rear structure in the pressing direction, during a time period between consecutive pressing actions, such that the pressing member during the next pressing cycle is targeted to become stopped at a position that has a maximal pressing force in the range of 0-100%, specifically 5-50%, above the pressing force produced when the pressing motion was stopped. Thereby, the operating position of the toggle press may be adjusted to fit the specific characteristic of the cellulose blank structure and forming mold shape.

In some example embodiments, which may be combined with any one or more of the above-described embodiments, the electronic control system is configured for: controlling operation of the pressing actuator arrangement for either moving the pressing member forwards while monitoring pressing force indicating feedback information from the pressing force indicating arrangement, stopping an ongoing pressing motion of the pressing when a parameter value derived from or associated with the pressing force indicating feedback information is at predetermined threshold value or within a predetermined range, and initiating return motion of the pressing member, or using a feedback controller having a parameter associated with the pressing force indicating feedback information as feedback process variable; and controlling operation of the adjustment actuator arrangement, based on pressing force indicating feedback information received from the pressing force indicating arrangement, for adjusting the distance between the front structure and rear structure in the pressing direction, during a time period between consecutive pressing actions, such that the pressing member during the next pressing cycle is targeted to become stopped at a position that has a maximal pressing force in the range of 0-100%, specifically 5-50%, above the pressing force produced when the pressing motion was stopped. Thereby, the operating position of the toggle press may be adjusted to fit the specific characteristic of the cellulose blank structure and forming mold shape.

In some example embodiments, which may be combined with any one or more of the above-described embodiments, the electronic control system is configured for: during normal running of the cellulose product toggle pressing module, controlling operation of the pressing actuator arrangement for providing a substantially fixed output force to the toggle-mechanism at each pressing action; obtaining pressing force indicating information from the pressing force indicating arrangement during pressing actions; and controlling the adjustment actuator arrangement for adjusting the distance between the front structure and rear structure, during a time period between consecutive pressing actions, for maintaining a value indicative of resulting maximal pressing force and derived from or associated with the pressing force indicating information at a predetermined threshold value or within a predetermined range. Thereby, the operating position of the toggle press may be adjusted to fit the specific characteristic of the cellulose blank structure and forming mold shape without relying on the detected press force during each press action.

In some example embodiments, which may be combined with any one or more of the above-described embodiments, the pressing force indicating arrangement is a pressing member position detection arrangement, wherein the pressing force indicating feedback information obtained from the pressing member position detection arrangement represents a position of the pressing member or a mold gap between the first and second mold parts, and wherein the electronic control system is configured for: during normal running of the cellulose product toggle pressing module, controlling operation of the pressing actuator arrangement for moving the pressing member forwards and for providing a substantially fixed output force to the toggle-mechanism at each pressing action, and subsequently controlling operation of the pressing actuator arrangement for moving the pressing member rearwards; and obtaining pressing force indicating information from the pressing member position detection arrangement at each or every Nth pressing action, and in connection thereto controlling the adjustment actuator arrangement for adjusting the distance between the front structure and rear structure, during a time period between consecutive pressing actions, for maintaining a parameter value indicative of resulting maximal pressing force and derived from or associated with the pressing force indicating information at a predetermined threshold value or within a predetermined range. Thereby, the operating position of the toggle press may be adjusted to fit the specific characteristic of the cellulose blank structure and forming mold shape without relying on the detected press force during each press action. The term Nth herein refers to a number larger than one, e.g. every second, third, tenth, etc.

In some example embodiments, which may be combined with any one or more of the above-described embodiments, the pressing force indicating arrangement is a pressing force detection arrangement, wherein the pressing force indicating feedback information obtained from the pressing force detection arrangement represents a pressing force of the pressing member, and wherein the electronic control system is configured for: during normal running of the cellulose product toggle pressing module, controlling operation of the pressing actuator arrangement for moving the pressing member forwards and for providing a substantially fixed output force to the toggle-mechanism at each pressing action, and subsequently controlling operation of the pressing actuator arrangement for moving the pressing member rearwards; and obtaining pressing force indicating information from the pressing force detection arrangement at each or every Nth pressing action, and in connection thereto controlling the adjustment actuator arrangement for adjusting the distance between the front structure and rear structure, during a time period between consecutive pressing actions, for maintaining a parameter value indicative of resulting maximal pressing force and derived from or associated with the pressing force indicating information at a predetermined threshold value or within a predetermined range. Thereby, the operating position of the toggle press may be adjusted to fit the specific characteristic of the cellulose blank structure and forming mold shape without relying on the detected press force during each press action.

In some example embodiments, which may be combined with any one or more of the above-described embodiments, each of the first and second mold parts comprises a main rigid plate-shaped body with a surface configured for facing the other mold part, and at least one pressing surface defining one or more forming cavities for forming a cellulose product, and with or without additional minor parts, such as spring-loaded cutting devices and/or mold alignment devices, or the like, wherein said surfaces of the main rigid plate-shaped body of the first and second mold forming parts are free from mutual direct contact during a pressing cycle. Thereby, the forming mold may be used for press forming of a non-flat cellulose product with a certain forming pressure without undesired interference between said surfaces.

In some example embodiments, which may be combined with any one or more of the above-described embodiments, the toggle-mechanism includes a first link member and a second link member, wherein the pressing actuator arrangement is directly or indirectly drivingly connected to the first or second link member, such that actuation of the pressing actuator arrangement results in motion of the pressing member. This type of toggle mechanism enables a compact, cost-efficient and reliable toggle mechanism.

In some example embodiments, which may be combined with any one or more of the above-described embodiments, the toggle-mechanism includes a first link member and a second link member, each having first and second pivot connections, wherein the first pivot connection of the first link member is pivotally connected to the rear structure, wherein the first pivot connection of the second link member is pivotally connected to the pressing member, wherein the second pivot connection of the first link member is pivotally connected to the second pivot connection of the second link member, and wherein the pressing actuator arrangement is directly or indirectly drivingly connected to the first or second link member for adjusting a level of alignment between the first and second link members, such that actuation of the pressing actuator arrangement results in motion of the pressing member. This type of toggle mechanism enables a compact, cost-efficient and reliable toggle mechanism.

In some example embodiments, which may be combined with any one or more of the above-described embodiments, the toggle pressing module further comprises an actuation motion limiting arrangement configured for mechanically limiting a forwards actuation motion of the pressing member and/or mechanically preventing the toggle mechanism from reaching its maximal stroke state. Thereby, the risk for unintentional over pressure during forming is reduced.

The disclosure also relates to a product forming unit for manufacturing non-flat cellulose products from an air-formed cellulose blank structure. The product forming unit comprises a buffering module and a toggle pressing module. The product forming unit is adapted for feeding the cellulose blank structure to the buffering module, buffering the cellulose blank structure in the buffering module, and feeding the cellulose blank structure from the buffering module to the toggle pressing module. The buffering module comprises a blank feeding system configured for continuously feeding the cellulose blank structure to the buffering module in a first feeding direction, and intermittently feeding the cellulose blank structure from the buffering module in a second feeding direction, wherein the second feeding direction differs from the first feeding direction.

In some example embodiments, which may be combined with any one or more of the above-described embodiments, the product forming unit further comprises a blank dry-forming module configured for providing the cellulose blank structure.

In some example embodiments, which may be combined with any one or more of the above-described embodiments, the blank dry-forming module comprises a mill, a forming chamber, and a forming wire arranged in connection to the forming chamber, wherein the mill is configured for separating fibers from a cellulose raw material, wherein the forming chamber is configured for distributing the separated fibers onto a forming section of the forming wire for forming the cellulose blank structure.

In some example embodiments, which may be combined with any one or more of the above-described embodiments, the forming section is extending in an upwards blank forming direction.

In some example embodiments, which may be combined with any one or more of the above-described embodiments, the toggle press further includes a pressing force indicating arrangement wherein the electronic control system is operatively connected to the pressing force indicating arrangement, and wherein the step of controlling operation of the pressing actuator arrangement by means of the electronic control system is based on pressing force indicating feedback information received from the pressing force indicating arrangement.

In some example embodiments, which may be combined with any one or more of the above-described embodiments, the method further comprising providing the toggle press with a feeding device for feeding the air-formed cellulose blank structure into a pressing area located between the first and second mold parts, and feeding the air-formed cellulose blank structure by the feeding device primarily vertically downwards into the pressing area, specifically feeding the air-formed cellulose blank structure downwards with an angle of less than 20 degrees from a vertical direction into the pressing area, and more specifically feeding the air-formed cellulose blank structure vertically downwards into the pressing area.

In some example embodiments, which may be combined with any one or more of the above-described embodiments, the feeding device for feeding the air-formed cellulose blank structure into the pressing area includes an elongated vacuum belt feeder or an elongated tractor belt feeder, and the method comprises arranging the elongated vacuum belt feeder primarily in a vertical direction, specifically with a direction of elongated within 20 degrees from the vertical direction, and more specifically in parallel with the vertical direction.

In some example embodiments, which may be combined with any one or more of the above-described embodiments, the step of controlling operation of the pressing actuator arrangement by means of an electronic control system involves obtaining pressing force indicating feedback information from the pressing force indicating arrangement, and controlling operation of the pressing actuator arrangement: for stopping an ongoing pressing motion of the pressing member when a parameter value derived from or associated with the pressing force indicating feedback information is at predetermined threshold value or within a predetermined range; or using a feedback controller having a parameter associated with the pressing force indicating feedback information as feedback process variable.

In some example embodiments, which may be combined with any one or more of the above-described embodiments, the pressing force indicating arrangement is a pressing member position detection arrangement, wherein the pressing force indicating feedback information obtained from the pressing member position detection arrangement represents a position of the pressing member or a mold gap between the first and second mold parts, and wherein the step of controlling operation of the pressing actuator arrangement by means of an electronic control system involves: stopping an ongoing pressing motion of the pressing member when a detected position of the pressing member or a mold gap between the first and second mold parts is at a predetermined threshold value or within a predetermined range; or using a feedback controller having a parameter associated with the pressing force indicating feedback information as feedback process variable.

In some example embodiments, which may be combined with any one or more of the above-described embodiments, the pressing force indicating arrangement is a pressing force detection arrangement, wherein the pressing force indicating feedback information obtained from the pressing force detection arrangement represents a pressing force of the pressing member, and wherein the step of controlling operation of the pressing actuator arrangement by means of an electronic control system involves: stopping an ongoing pressing motion of the pressing member when a detected pressing force of the pressing member is equal to or exceeds a predetermined threshold value; or using a feedback controller having a parameter associated with the pressing force indicating feedback information as feedback process variable.

In some example embodiments, which may be combined with any one or more of the above-described embodiments, the toggle press further includes a front structure, a rear structure, mechanical adjustment mechanism and an adjustment actuator arrangement configured for driving the mechanical adjustment mechanism, wherein the toggle-mechanism is connected to the rear structure, wherein the second mold part is attached to the front structure, wherein the mechanical adjustment mechanism enables adjustment of a distance between the front structure and rear structure in the pressing direction, and wherein the method further comprises controlling operation of the adjustment actuator arrangement for adjusting the distance between the front structure and rear structure in the pressing direction.

In some example embodiments, which may be combined with any one or more of the above-described embodiments, the step of controlling operation of the adjustment actuator arrangement involves controlling operation of the adjustment actuator arrangement, based on pressing force indicating feedback information received from the pressing force indicating arrangement, for adjusting the distance between the front structure and rear structure in the pressing direction, during a time period between consecutive pressing actions, such that the pressing member during the next pressing cycle is targeted to become stopped at a position that has a maximal pressing force in the range of 0-100%, specifically 5-50%, above the pressing force produced when the pressing motion was stopped.

In some example embodiments, which may be combined with any one or more of the above-described embodiments, the step of controlling the pressing actuating arrangement involves controlling operation of the pressing actuator arrangement: by either moving the pressing member forwards while monitoring pressing force indicating feedback information from the pressing force indicating arrangement, stopping an ongoing pressing motion of the pressing member when a parameter value derived from or associated with the pressing force indicating feedback information is at predetermined threshold value or within a predetermined range, and initiating return motion of the pressing member, or using a feedback controller having a parameter associated with the pressing force indicating feedback information as feedback process variable; and the step of controlling operation of the adjustment actuator arrangement involves controlling operation of the adjustment actuator arrangement, based on pressing force indicating feedback information received from the pressing force indicating arrangement, for adjusting the distance between the front structure and rear structure in the pressing direction, during a time period between consecutive pressing actions, such that the pressing member during the next pressing cycle is targeted to become stopped at a position that has a maximal pressing force in the range of 0-100%, specifically 5-50%, above the pressing force produced when the pressing motion was stopped.

In some example embodiments, which may be combined with any one or more of the above-described embodiments, the toggle press further includes a pressing force indicating arrangement, wherein the electronic control system is operatively connected to the pressing force indicating arrangement, and wherein the step of controlling operation of the adjustment actuator arrangement for adjusting the distance between the front structure and rear structure in the pressing direction is performed during a time period between consecutive pressing actions and is based on pressing force indicating feedback information received from the pressing force indicating arrangement.

In some example embodiments, which may be combined with any one or more of the above-described embodiments, the step of controlling operation of the pressing actuator arrangement for forming the non-flat cellulose product from the air-formed cellulose blank structure involves: during normal running of the cellulose product toggle pressing module, controlling operation of the pressing actuator arrangement for providing a substantially fixed output force to the toggle-mechanism at each pressing action; obtaining pressing force indicating information from the pressing force indicating arrangement during pressing actions; and controlling the adjustment actuator arrangement for adjusting the distance between the front structure and rear structure, during a time period between consecutive pressing actions, for maintaining a parameter value indicative of resulting maximal pressing force and derived from or associated with the pressing force indicating information at a predetermined threshold value or within a predetermined range.

In some example embodiments, which may be combined with any one or more of the above-described embodiments, the pressing force indicating arrangement is a pressing member position detection arrangement, wherein the pressing force indicating feedback information obtained from the pressing member position detection arrangement represents a position of the pressing member or a mold gap between the first and second mold parts, wherein the step of controlling operation of the pressing actuator arrangement for forming the non-flat cellulose product from the air-formed cellulose blank structure involves: during normal running of the cellulose product toggle pressing module, controlling operation of the pressing actuator arrangement for moving the pressing member forwards and for providing a substantially fixed output force to the toggle-mechanism at each pressing action, and subsequently controlling operation of the pressing actuator arrangement for moving the pressing member rearwards; and obtaining pressing force indicating information from the pressing member position detection arrangement at each or every Nth pressing action, and in connection thereto controlling the adjustment actuator arrangement for adjusting the distance between the front structure and rear structure, during a time period between consecutive pressing actions, for maintaining a parameter value indicative of resulting maximal pressing force and derived from or associated with the pressing force indicating information at a predetermined threshold value or within a predetermined range.

In some example embodiments, which may be combined with any one or more of the above-described embodiments, the pressing force indicating arrangement is a pressing force detection arrangement, wherein the pressing force indicating feedback information obtained from the pressing force detection arrangement represents a pressing force of the pressing member, and wherein the step of controlling operation of the pressing actuator arrangement for forming the non-flat cellulose product from the air-formed cellulose blank structure involves: during normal running of the cellulose product toggle pressing module, controlling operation of the pressing actuator arrangement for moving the pressing member forwards and for providing a substantially fixed output force to the toggle-mechanism at each pressing action, and subsequently controlling operation of the pressing actuator arrangement for moving the pressing member rearwards; and obtaining pressing force indicating information from the pressing force detection arrangement at each or every Nth pressing action, and in connection thereto controlling the adjustment actuator arrangement for adjusting the distance between the front structure and rear structure, during a time period between consecutive pressing actions, for maintaining a parameter value indicative of resulting maximal pressing force and derived from or associated with the pressing force indicating information at a predetermined threshold value or within a predetermined range.

In some example embodiments, which may be combined with any one or more of the above-described embodiments, the step of forming the cellulose products from the cellulose blank structure in the forming mold involves heating the cellulose blank structure to a forming temperature in the range of 100-300° C., and pressing the cellulose blank structure with a forming pressure in the range of 1-100 MPa, preferably 4-20 MPa.

In some example embodiments, which may be combined with any one or more of the above-described embodiments, the method further comprises the step of: providing the cellulose blank structure and feeding the cellulose blank structure to a buffering module, and buffering the cellulose blank structure in the buffering module, and feeding the cellulose blank structure from the buffering module to the pressing module, wherein the cellulose blank structure is continuously fed to the buffering module in a first feeding direction, and intermittently fed from the buffering module in a second feeding direction, wherein the second feeding direction differs from the first feeding direction.

In some example embodiments, which may be combined with any one or more of the above-described embodiments, the step of providing the cellulose blank structure involves providing a cellulose raw material and feeding the cellulose raw material to a blank dry-forming module, dry-forming the cellulose blank structure from the cellulose raw material in the blank dry-forming module.

In some example embodiments, which may be combined with any one or more of the above-described embodiments, the step of dry-forming the cellulose blank structure from the cellulose raw material in the blank dry-forming module involves: separating fibers from the cellulose raw material in a mill and distributing the separated fibers onto a forming wire of the blank dry-forming module for forming the cellulose blank structure, and transporting the formed cellulose blank structure in the upwards blank forming direction towards the buffering module.

In some implementations of the cellulose product toggle pressing module, focus is more set on aspects associated with performing the forming process based on pressing force indicating feedback received from a pressing force indicating arrangement. Therefore, the present disclosure also relates to a cellulose product toggle pressing module for forming non-flat cellulose products from an air-formed cellulose blank structure, the toggle pressing module comprising: a toggle press including pressing member movably arranged in a pressing direction, a toggle-mechanism drivingly connected to the pressing member, a pressing actuator arrangement drivingly connected to the toggle-mechanism, a pressing force indicating arrangement, and an electronic control system operatively connected to the pressing actuator arrangement and to the pressing force indicating arrangement; and a forming mold including a moveable first mold part attached to the pressing member and a second forming mold; wherein the electronic control system is configured for controlling operation of pressing actuator arrangement, based on pressing force indicating feedback received from the pressing force indicating arrangement, for driving the pressing member using the toggle-mechanism in the pressing direction and forming the non-flat cellulose product from the air-formed cellulose blank structure by pressing the first mold part against the second mold part. Thereby, better control of the pressing operation may be accomplished.

Further features and advantages of the invention will become apparent when studying the appended claims and the following description. The skilled person in the art realizes that different features of the present disclosure may be combined to create embodiments other than those explicitly described hereinabove and below, without departing from the scope of the present disclosure.

BRIEF DESCRIPTION OF THE DRAWINGS

The cellulose product toggle pressing module and associated method for forming non-flat cellulose according to the disclosure will be described in detail in the following, with reference to the attached drawings, in which.

DETAILED DESCRIPTION OF THE DRAWINGS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

The cellulose product toggle pressing module according to the disclosure will first be described in the context of a product forming unit U for manufacturing non-flat cellulose products 1 from an air-formed cellulose blank structure 2.

Figure 1A:
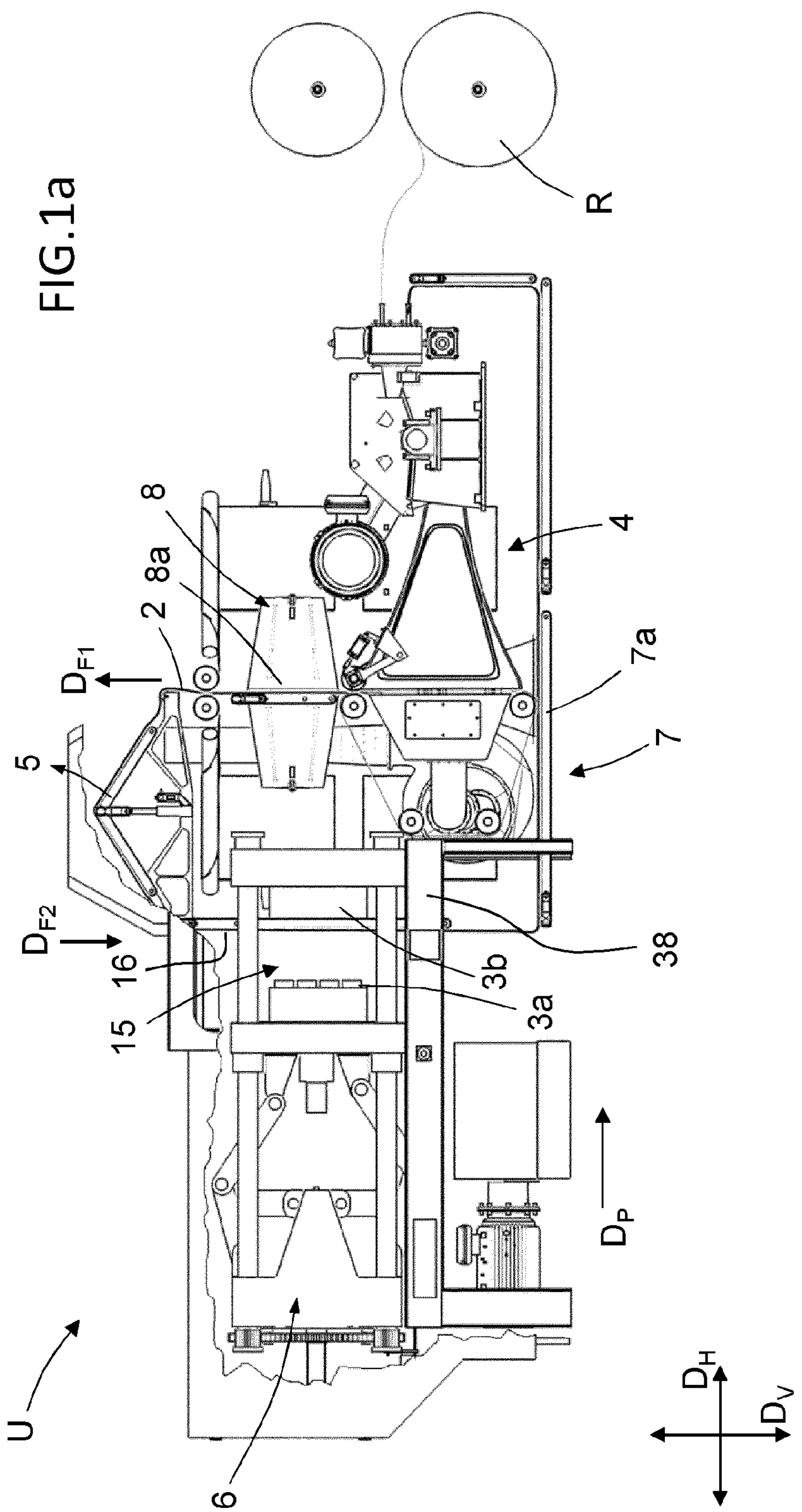
FIG. 1*a*-*b* show schematically, in a side view and a perspective view, a product forming unit according to the disclosure.
Figure 1B:
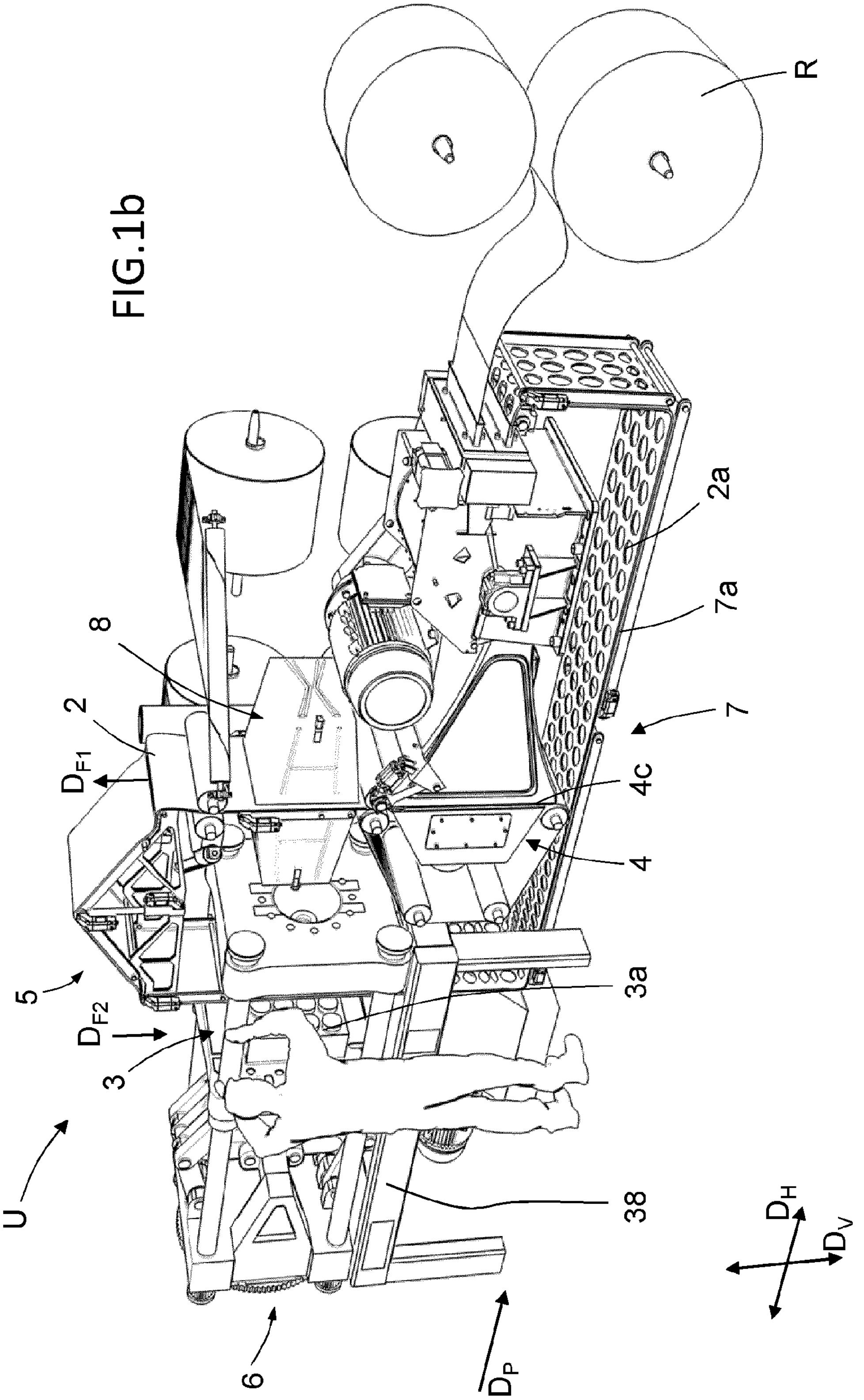

FIGS. 1*a*-*b* schematically show a product forming unit U for manufacturing non-flat cellulose products 1 from an air-formed cellulose blank structure 2. The product forming unit U comprises a buffering module 5 and the pressing module 6, as will be further described below. The cellulose products 1 are manufactured from the cellulose blank structure 2 in the product forming unit U. The cellulose blank structure 2 is provided from a suitable source and fed to the buffering module 5 and the pressing module 6. The forming of the cellulose products 1 is accomplished in the pressing module 6. With non-flat products is meant products that have an extension in three dimensions, which is different from flat products like blanks or sheets.

With an air-formed cellulose blank structure 2 according to the disclosure is meant an essentially air-formed fibrous web structure produced from cellulose fibers. The cellulose fibers may originate from a suitable cellulose raw material R, such as a pulp material. Suitable pulp materials are for example fluff pulp, paper structures, or other cellulose fiber containing structures. With air-forming of the cellulose blank structure 2 is meant the formation of a cellulose blank structure in a dry-forming process in which the cellulose fibers are air-formed to produce the cellulose blank structure 2. When forming the cellulose blank structure 2 in the air-forming process, the cellulose fibers are carried and formed to the fiber blank structure 2 by air as carrying medium. This is different from a normal papermaking process or a traditional wet-forming process, where water is used as carrying medium for the cellulose fibers when forming the paper or fiber structure. In the air-forming process, small amounts of water or other substances may if desired be added to the cellulose fibers in order to change the properties of the cellulose product, but air is still used as carrying medium in the forming process. The cellulose blank structure 2 may, if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose products 1.

Figure 1C:
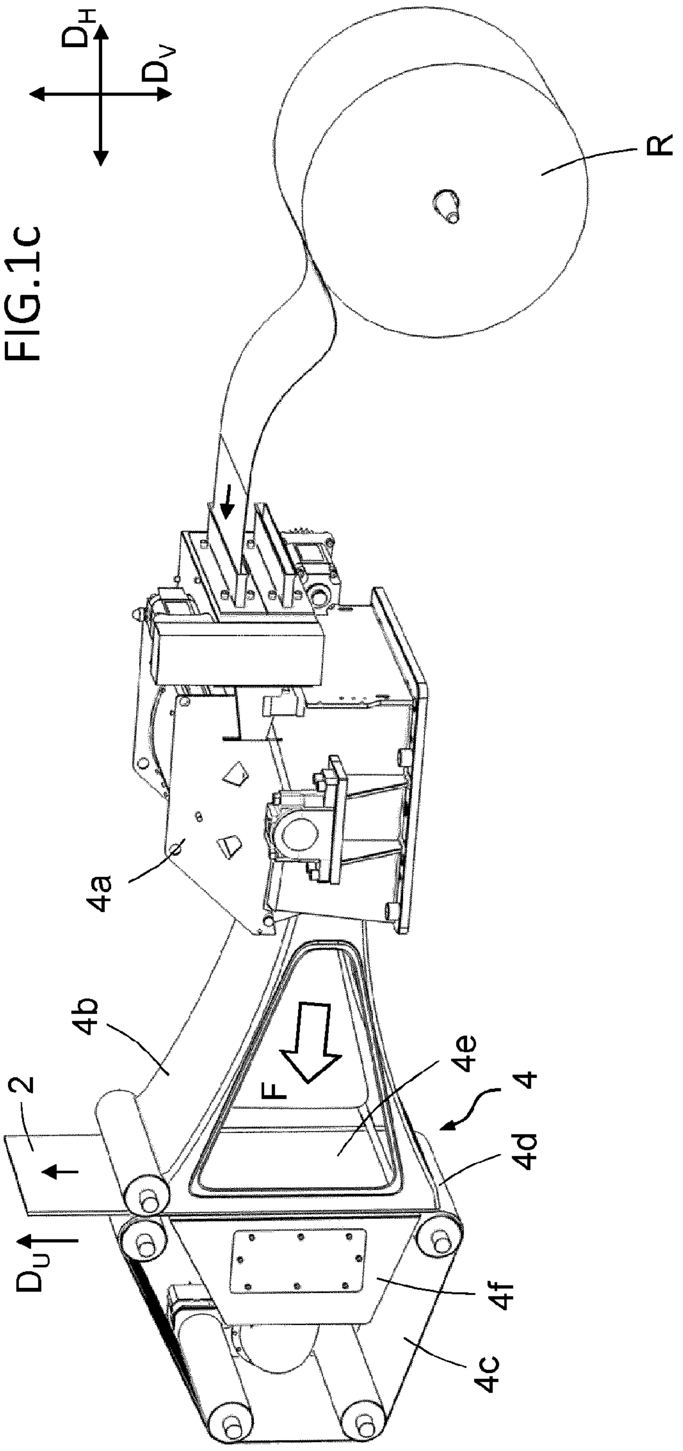
FIG. 1*c* shows schematically, in a perspective view, a blank dry-forming module according to the disclosure.

A blank dry-forming module 4, which is integrated in the product forming unit U showed in FIGS. 1*a*-*b* and illustrated more in detail in FIG. 1*c*, includes a horizontal blowing direction of the fibers from the mill 4*a* to the forming wire 4*c*. Since the length of the fiber carrying distance by air, inside a forming chamber 4*b*, needs to be enough to equalize turbulence and/or create a uniform flow of cellulose fibers, this embodiment with the horizontal blowing direction reduces the height of the product forming unit and enables access for maintenance to the mill from plant floor without additional elevated flooring or platforms.

In particular, the cellulose raw material R is provided from a suitable source and the cellulose raw material R is fed to the blank dry-forming module 4. The cellulose blank structure 2 is dry-formed from the cellulose raw material R in the blank dry-forming module 4, and thereafter the cellulose blank structure 2 is fed from the blank dry-forming module 4 to the buffering module 5. The blank dry-forming module 4 comprises a mill 4*a*, a forming chamber 4*b*, and a forming wire 4*c* arranged in connection to the forming chamber 4*b*. Fibers F from the cellulose raw material R is separated from the cellulose raw material R in the mill 4*a* and the separated fibers F are distributed into the forming chamber 4*b* onto the forming wire 4*c* for forming the cellulose blank structure 2. The mill 4*a* is configured for separating cellulose fibers F from the cellulose raw material R, and the forming chamber 4*b* is configured for distributing the separated fibers F onto a forming section 4*d* of the forming wire 4*c* for forming the cellulose blank structure 2. The forming section 4*d* is arranged in connection to a forming chamber opening 4*e* of the forming chamber 4*b*. In the illustrated embodiment, the forming section 4*d* is extending in an upwards blank forming direction Du. The cellulose blank structure 2 is formed onto the forming section 4*d*, and transported from the forming section 4*d* in the upwards blank forming direction Du towards the buffering module 5. The upwards blank forming direction Du is used for a compact configuration and layout of the product forming unit U, allowing an efficient positioning of the different modules of the product forming unit U in relation to each other. After forming of the cellulose blank structure 2 onto the forming section 4*d*, the formed cellulose blank structure 2 is transported from the forming section 4*d* in the upwards blank forming direction Du towards the buffering module 5.

The mill 4*a* is separating the fibers F from the cellulose raw material R and is distributing the separated fibers F into the forming chamber 4*b*. The pulp structure 20 used may for example be bales, sheets, or rolls of fluff pulp, paper structures, or other suitable cellulose fiber containing structures, that are fed into the mill 4*a*. The mill 4*a* may be of any conventional type, such as for example a hammer mill, a saw-tooth mill, or other type of pulp de-fiberizing machine. The pulp structure 20 is fed into the mill 4*a* through an inlet opening, and the separated fibers F are distributed to the forming chamber 4*b* through an outlet opening of the mill 4*a* arranged in connection to the forming chamber 4*b*.

The forming chamber 4*b* is arranged for distributing the separated fibers onto the forming wire 4*c* for forming the cellulose blank structure 2. The forming chamber 4*b* is arranged as a hood structure or compartment in connection to the forming wire 4*c*. The forming chamber 4*b* is enclosing a volume in which the separated fibers F are distributed from the mill 4*a* to the forming wire 4*c*.

The forming wire 4*c* may be of any suitable conventional type, and may be formed as an endless belt structure, as illustrated in FIGS. 1*a*-*b*. A vacuum box 4*f* may be arranged in connection to the forming wire 4*c* and the forming chamber 4*b* for controlling the flow of air in the forming chamber 4*b*, and for distributing the separated fibers F onto the forming wire 4*c*.

The air-formed cellulose blank structure 2 may be formed of cellulose fibers in a conventional air-forming process or in a blank dry-forming module 4 as illustrated in FIG. 1*a*-b, and be configured in different ways. For example, the cellulose blank structure 2 may have a composition where the fibers are of the same origin or alternatively contain a mix of two or more types of cellulose fibers, depending on the desired properties of the cellulose products 1. The cellulose fibers used in the cellulose blank structure 2 are during the forming process of the cellulose products 1 strongly bonded to each other with hydrogen bonds. The cellulose fibers may be mixed with other substances or compounds to a certain amount as will be further described below. With cellulose fibers is meant any type of cellulose fibers, such as natural cellulose fibers or manufactured cellulose fibers. The cellulose blank structure 2 may specifically comprise at least 95% cellulose fibers, or more specifically at least 99% cellulose fibers.

The air-formed cellulose blank structure 2 may have a single-layer or a multi-layer configuration. A cellulose blank structure 2 having a single-layer configuration is referring to a structure that is formed of one layer containing cellulose fibers. A cellulose blank structure 2 having a multi-layer configuration is referring to a structure that is formed of two or more layers comprising cellulose fibers, where the layers may have the same or different compositions or configurations.

The cellulose blank structure 2 may comprise a reinforcement layer comprising cellulose fibers, where the reinforcement layer may be arranged as a carrying layer for one or more other layers of the cellulose blank structure 2. The reinforcement layer may have a higher tensile strength than other layers of the cellulose blank structure 2. This is useful when one or more air-formed layers of the cellulose blank structure 2 have compositions with low tensile strength in order to avoid that the cellulose blank structure 2 will break during the forming of the cellulose products 1. The reinforcement layer with a higher tensile strength acts in this way as a supporting structure for other layers of the cellulose blank structure 2. The reinforcement layer may be of a different composition than the rest of the cellulose blank structure, such as for example a tissue layer containing cellulose fibers, an air laid structure comprising cellulose fibers, or other suitable layer structures. It is thus not necessary that the reinforcement layer is air-formed. The cellulose blank structure 2 may comprise more than one reinforcement layer if suitable.

The one or more air-formed layers of the cellulose blank structure 2 are fluffy and airy structures, where the cellulose fibers forming the structures are arranged relatively loosely in relation to each other. The fluffy cellulose blank structures 2 are used for an efficient forming of the cellulose products 1, allowing the cellulose fibers to form the cellulose products 1 in an efficient way during the forming process.

The product forming unit U may further comprise a barrier application module 8 arranged upstream the buffering module 5, as shown in FIGS. 1*a-b*. The barrier application module 8 is configured for applying a barrier composition onto the cellulose blank structure 2 before forming the cellulose products 1 in one or more forming molds 3.

One preferred property of the cellulose products 1 is the ability to hold or withstand liquids, such as for example when the cellulose products are used in contact with beverages, food, and other water-containing substances. The barrier composition may be one or more additives used when producing the cellulose products, such as for example AKD or latex, or other suitable barrier compositions. Another suitable barrier composition is a combination of AKD and latex, where tests have shown that unique product properties may be achieved with a combination of AKD and latex added to the air-formed cellulose blank structure 2 when forming the cellulose products 1. When using the combination of AKD and latex, a high level of hydrophobicity can be achieved, resulting in cellulose products 1 with a high ability to withstand liquids, such as water, without negatively affecting the mechanical properties of the cellulose products 1.

The barrier application module 8 may be arranged as a hood structure in connection to the cellulose blank structure 2, and the hood structure is comprising spray nozzles that are spraying the barrier composition continuously or intermittently onto the cellulose blank structure 2. In this way, the barrier composition is applied onto the cellulose blank structure 2 in the barrier application module 8. The barrier composition may be applied on only one side of the cellulose blank structure or alternatively on both sides. The barrier composition may further be applied over the whole surface or surfaces of the cellulose blank structure 2, or only on parts or zones of the surface or surfaces of the cellulose blank structure 2. The hood structure of the barrier application module is preventing the barrier composition from being spread into the surrounding environment. Other application technologies for applying the barrier structure may for example include slot coating and/or screen-printing.

The product forming unit U shown in FIGS. 1*a-b* comprises the buffering module 5 and the pressing module 6. The product forming unit U is adapted for feeding the cellulose blank structure 2 to the buffering module 5, buffering the cellulose blank structure 2 in the buffering module 5, and feeding the cellulose blank structure 2 from the buffering module 5 to the pressing module 6. The product forming unit U is further adapted for forming the non-flat cellulose products 1 from the cellulose blank structure 2 in the one or more forming molds 3 by heating the cellulose blank structure 2 to the forming temperature TF, and pressing the cellulose blank structure 2 with the forming pressure. The one or more forming molds 3 are configured for forming the non-flat cellulose products 1 from the cellulose blank structure 2 by heating the cellulose blank structure 2 to the forming temperature TF in the range of 100-300° C., and pressing the cellulose blank structure 2 with a forming pressure in the range of 1-100 MPa, preferably 4-20 MPa.

The buffering module 5 is as illustrated in for example FIGS. 1*a-b* arranged upstream the pressing module 6, and the buffering module 5 has the purpose to convert the feeding mode of the cellulose blank structure 2 from continuous feeding to intermittent feeding. Due to the relatively brittle structural properties of the cellulose blank structure 2, a continuous feeding from the cellulose blank structure source is suitable. However, due to the intermittent operation of the pressing module 6, the continuous feeding needs to be converted to intermittent feeding without breaking the cellulose blank structure 2. To achieve this, the buffering module 5 comprises a blank feeding system configured for continuously feeding the cellulose blank structure 2 to the buffering module 5, and intermittently feeding the cellulose blank structure 2 from the buffering module 5.

The blank feeding system is further configured for continuously feeding the cellulose blank structure 2 to the buffering module 5 in a first feeding direction $D_{F1}$, and intermittently feeding the cellulose blank structure 2 from the buffering module 5 in a second feeding direction $D_{F2}$, where the second feeding direction $D_{F2}$ differs from the first feeding direction $D_{F1}$. The differing first feeding direction $D_{F1}$ and second feeding direction $D_{F2}$ are allowing a compact configuration and layout of the product forming unit U, and an efficient and compact positioning of the different modules of the product forming unit U in relation to each other. During operation of the product forming unit U, the cellulose blank structure 2 is buffered in the buffering module 5, and fed from the buffering module 5 to the pressing module 6. The cellulose blank structure 2 is continuously fed to the buffering module 5 in the first feeding direction $D_{F1}$, and intermittently fed from the buffering module 5 in the second feeding direction $D_{F2}$.

In the illustrated embodiments, the first feeding direction $D_{F1}$ is an upwards direction and the second feeding direction $D_{F2}$ is a downwards direction, which is allowing a compact and efficient configuration of the product forming unit U.

The feeding route and feeding direction of the cellulose blank structure 2 of the example embodiment of FIGS. 1*a-b* is for clarification purpose schematically illustrated in FIG. 1*d*, and the compact configuration and layout of the product forming unit U enabled by routing the cellulose blank structure 2 first primarily upwards, then primarily horizontal and subsequently primarily downwards is clearly understandable, when compared with a conventional straight line horizontal routing of a cellulose product compression forming process.

Figure 1E:
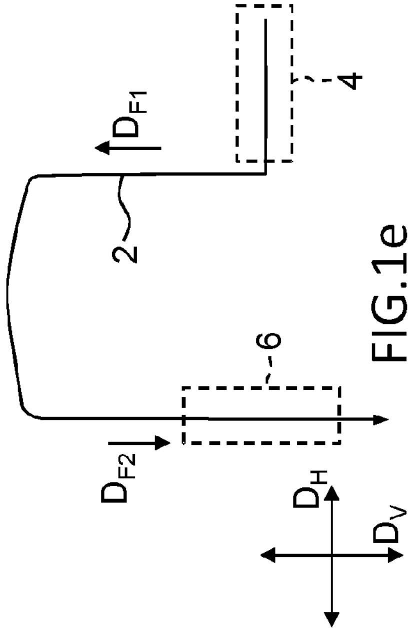
FIG. 1*d*-*e* show schematically two example embodiments of the routing of the cellulose blank structure within the product forming unit according to the disclosure.

Alternatively, the blank dry-forming module 4 may be arranged to have a primarily horizontal orientation of the feeding route and feeding direction of the cellulose blank structure 2, i.e. to have a primarily horizontal orientation of the forming wire 4*c* in the area of the forming chamber opening 4*e*, as schematically illustrated in FIG. 1*e*, before routing the cellulose blank structure 2 upwards, then primarily horizontal and subsequently primarily downwards to the pressing module 6. This layout of the product forming unit U may also be used for providing a compact product forming unit U.

Figure 1D:
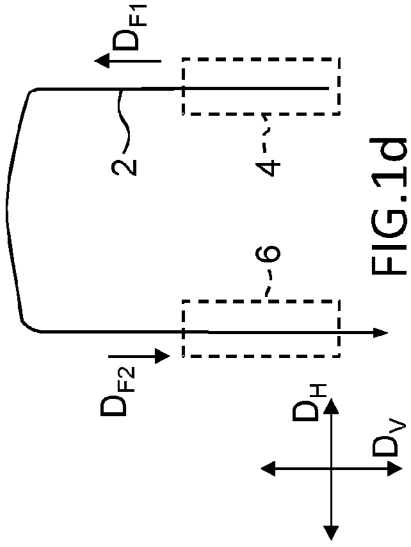

With reference to FIGS. 1*d-e*, the blank dry-forming module 4 typically forms the start of the feeding route and the pressing module 6 typically forms the end of the feeding route, when not taking a blank recycling module 7 into account. Other modules, such as the buffering module 5 and barrier application module 8 are located at any suitable positions between the dry-forming module 4 and the pressing module 6, i.e. downstream of the dry-forming module 4 and upstream of the pressing module 6, and not necessarily at the example positions of the embodiment of FIGS. 1*a-b*.

The primarily downwards routing of the cellulose blank structure while passing the pressing module 6 is beneficial in terms of simplified feeding of the cellulose blank structure 2, as well as simplified cellulose products 1 plundering after completed forming process, i.e. upon leaving the pressing module 6.

Specifically, high-speed intermittent feeding of the cellulose blank structure 2 from the buffering module 5 to the pressing module 6 may be difficult to accomplish with damaging or altering a characteristics of the cellulose blank structure 2, such as the thickness of the cellulose blank structure 2, or the like. However, by arranging the toggle press in a primarily horizontal direction DH and feeding the cellulose blank structure primarily downwards to the pressing module 6, the gravitational force assist this feeding process, thereby requiring less force to be applied by a feeding device for feeding the air-formed cellulose blank structure 2 into a pressing area 15 of the pressing module 6, and thereby reducing the risk for damages and/or altered characteristics of the cellulose blank structure 2.

Moreover, plundering of the finished and ejected cellulose products 1 after completed forming process may also be simplified by means of the primarily vertical routing of the cellulose blank structure 2 through the forming mold 3, because the gravitational force may also here assist and simplify removal of the finished and ejected cellulose products 1 from the forming mold 3, and subsequent transportation to a storage chamber or conveyer belt, or the like.

Figure 2A:
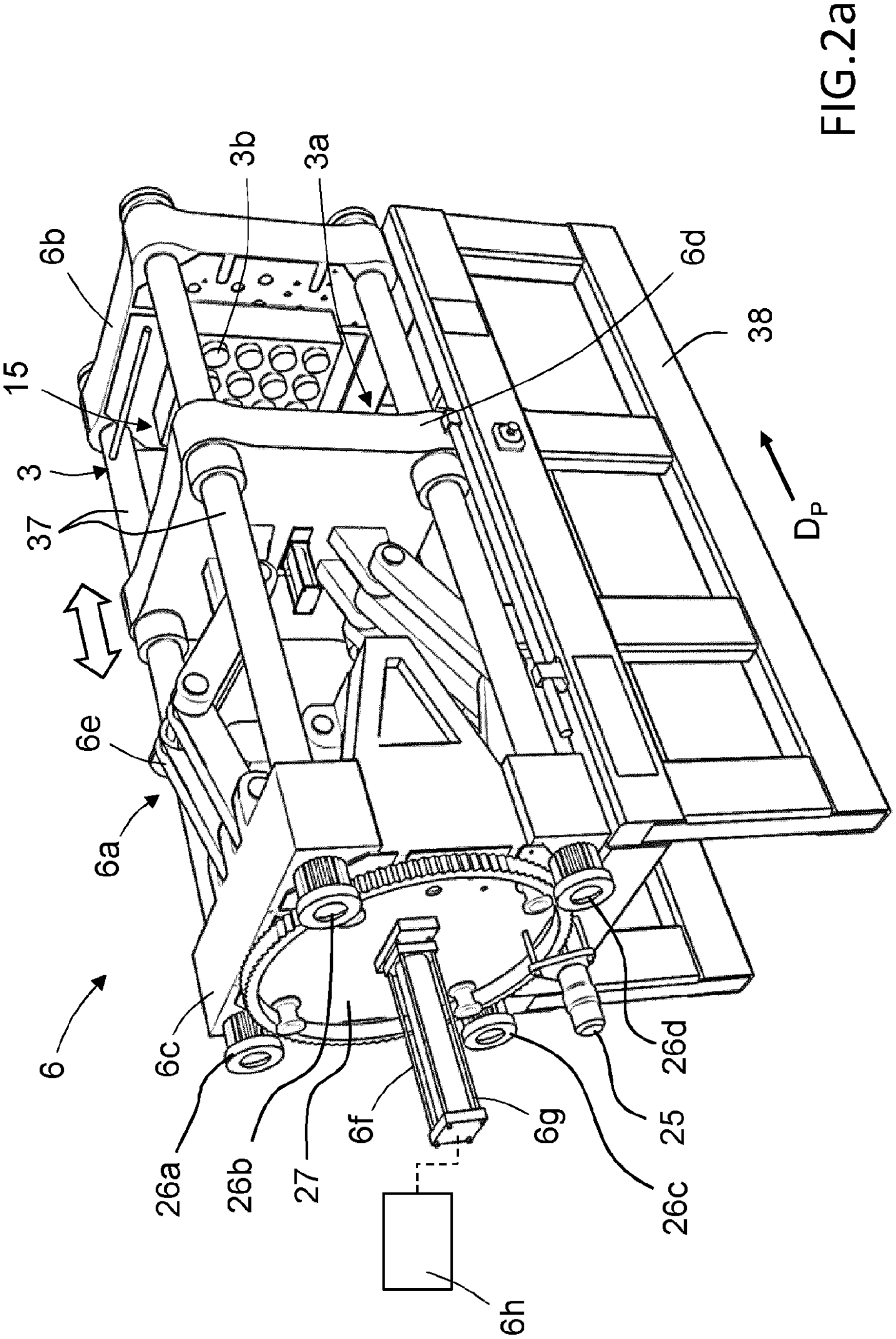
FIG. 2*a* shows schematically a perspective view of the pressing module according to the disclosure.

The pressing module 6 comprises one or more forming molds 3, as indicated in FIGS. 1*a-b* and 2*a*, and each forming mold 3 comprises a first mold part 3*a* and a second mold part 3*b*. Corresponding first and second mold parts are cooperating with each other during the forming of the non-flat cellulose products 1 in the pressing module 6. Each first mold part 3*a* and corresponding second mold part 3*b* are movably arranged in relation to each other, and the first mold part 3*a* and the second mold part 3*b* are configured for moving in relation to each other in a pressing direction Dp.

In the embodiment illustrated in FIGS. 1*a-b* and 2*a-e*, the second mold part 3*b* is stationary and the first mold part 3*a* is movably arranged in relation to the second mold part 3*b* in the pressing direction Dp. As indicated with the double arrow in FIG. 2*b*, the first mold part 3*a* is configured to move both towards the second mold part 3*b* and away from the second mold part 3*b* in linear movements along an axis extending in the pressing direction Dp.

In alternative embodiments, the first mold part 3*a* may be stationary with the second mold part 3*b* movably arranged in relation to the first mold part 3*a*, or both the first mold part 3*a* and the second mold part 3*b* may be movably arranged in relation to each other.

The pressing module 6 may be of a single-cavity configuration or alternatively of a multi-cavity configuration. A single-cavity pressing module comprises only one forming mold 3 with first and second mold parts. A multi-cavity pressing module comprises two or more forming molds 3, each having cooperating first and second mold parts. In the embodiment illustrated in FIGS. 1*a-b* and 2*a*, the pressing module 6 is arranged as a multi-cavity pressing module comprising a plurality of forming molds 3 with first and second mold parts, where the movements of the mold parts suitably are synchronized for a simultaneous forming operation. The part of the pressing module 6 shown in FIGS. 2*b-e* is illustrating the single-cavity configuration, or alternatively a section of the multi-cavity configuration with one forming mold 3. In the following, the pressing module 6 will be described in connection to a multi-cavity pressing module, but the disclosure is equally applicable on a single-cavity pressing module.

It should be understood that for all embodiments according to the disclosure, the expression moving in the pressing direction Dp includes a movement in the pressing direction Dp, and the movement may take place in opposite directions. The expression may further include both linear and non-linear movements of a mold part, where the result of the movement during forming is a repositioning of the mold part in the pressing direction Dp.

To form the non-flat cellulose products 1 from the air-formed cellulose blank structure 2 in the product forming unit U, the cellulose blank structure 2 is first provided from a suitable source. The cellulose blank structure 2 may be air-formed from cellulose fibers and arranged on rolls or in stacks. The rolls or stacks may thereafter be arranged in connection to the forming mold system S. As an alternative, the cellulose blank structure 2 may be air-formed from cellulose fibers in the blank dry-forming module 4 of the product forming unit U and directly fed to the pressing module 6 via the buffering module 5.

The cellulose products 1 are formed from the cellulose blank structure 2 in the one or more forming molds 3 by heating the cellulose blank structure 2 to a forming temperature TF in the range of 100-300° C., and pressing the cellulose blank structure 2 with a forming pressure in the range of 1-100 MPa, preferably 4-20 MPa. The first mold part 3*a* is arranged for forming the non-flat cellulose products 1 through interaction with the corresponding second mold parts 3*b*, as exemplified in FIGS. 2*b-e*. During forming of the cellulose products 1, the cellulose blank structure 2 is in each forming mold 3 exerted to the forming pressure in the range of 1-100 MPa, preferably in the range of 4-20 MPa, and the forming temperature TF in the range of 100-300° C. The cellulose products 1 are thus formed from the cellulose blank structure 2 between each of the first mold part 3*a* and corresponding second mold part 3*b* by heating the cellulose blank structure 2 to the forming temperature TF in the range of 100-300° C., and by pressing the cellulose blank structure 2 with the forming pressure in the range of 1-100 MPa, preferably in the range of 4-20 MPa. When forming the cellulose products 1, strong hydrogen bonds are formed between the cellulose fibers in the cellulose blank structure 2 arranged between the first mold part 3*a* and the second mold part 3*b*. The temperature and pressure levels are for example measured in the cellulose blank structure 2 during the forming process with suitable sensors arranged in or in connection to the cellulose fibers in the cellulose blank structure 2.

The pressing module 6 may further comprise a heating unit. The heating unit is configured for applying the forming temperature TF onto the cellulose blank structure 2 in each forming mold 3. The heating unit may have any suitable configuration. The heating unit may be integrated in or cast into the first mold part 3*a* and/or the second mold part 3*b*, and suitable heating devices are e.g. electrical heaters, such as a resistor element, or fluid heaters. Other suitable heat sources may also be used.

Figure 2C:
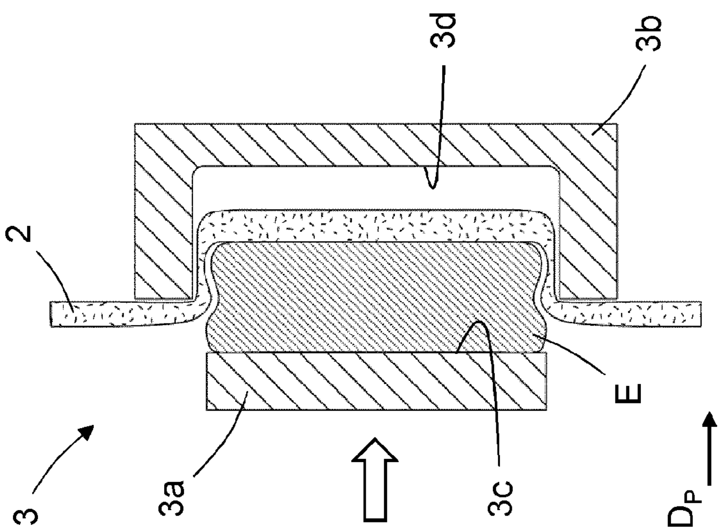
FIG. 2*b*-*e* show schematically side views of the cellulose forming process within the forming mold according to the disclosure.
Figure 2B:
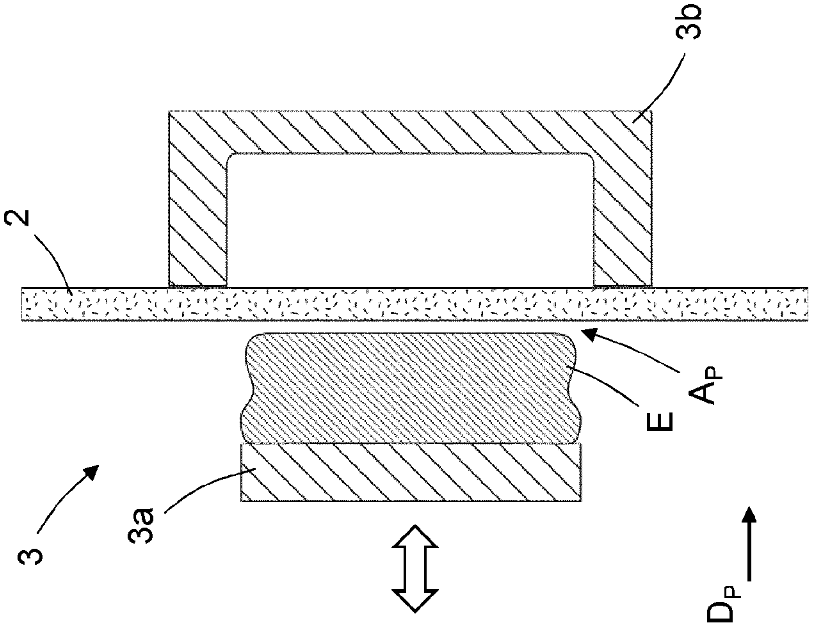
Figure 2E:
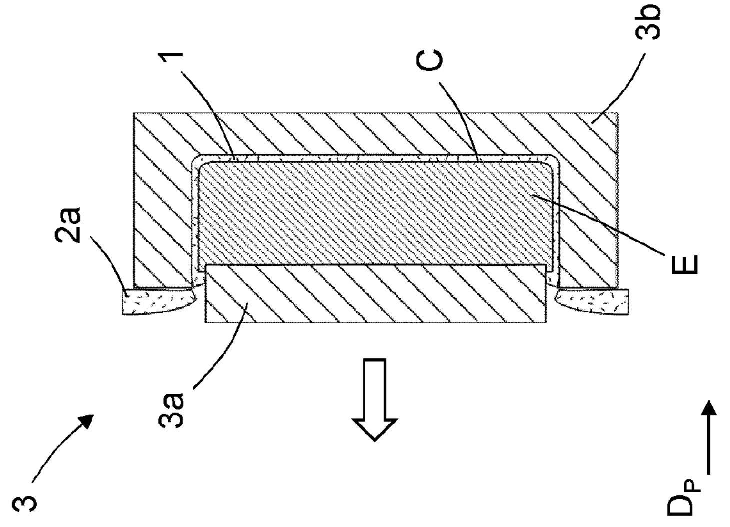
Figure 2D:
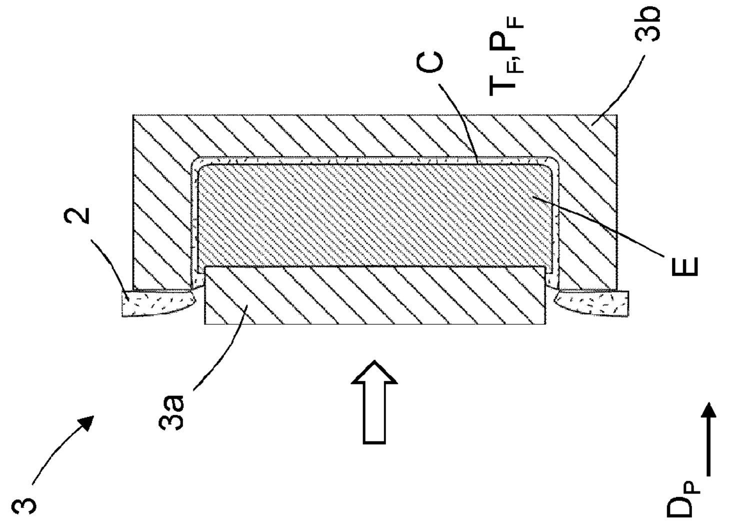

When the cellulose blank structure 2 is arranged in a forming position between the first mold part 3*a* and the second mold part 3*b*, as shown in FIG. 2*b*, the first mold part 3*a* is moved towards the second mold part 3*b* in the pressing direction Dp, as illustrated with the arrow in FIG. 2*c*. Upon movement of the first mold part 3*a* towards the second mold part 3*b*, the cellulose blank structure 2 is being increasingly compacted between the pressing surface 3*c*, 3*d* of the mold parts, until the first mold part 3*a* have been further moved towards the second mold part 3*b* and reached a product forming position, as shown in FIG. 2*d*, in which the forming pressure and forming temperature TF is exerted onto the cellulose blank structure 2. A forming cavity C for forming the cellulose products 1 is formed between each first mold part 3*a* and second mold part 3*b* during forming of the cellulose products 1 when each first mold part 3*a* is pressed towards its corresponding second mold part 3*b* with the cellulose blank structure 2 arranged between the mold parts. The forming pressure and the forming temperature TF are applied to the cellulose blank structure 2 in each forming cavity C. The forming of the cellulose products 1 may further include an edge-forming operation and a cutting or separation operation in the pressing module 6, where edges are formed on the cellulose products 1 and where the cellulose products 1 are separated from the cellulose blank structure 2 during forming of the cellulose products 1. The mold parts may for example be arranged with edge-forming devices and cutting or separation devices for such operations, or alternatively the edges may be formed in the product cutting or separation operation. Once the cellulose products 1 have been formed in the forming mold system S, the first mold part 3*a* is moved in a direction away from the second mold part 3*b*, as shown in FIG. 2*e*, and the cellulose products 1 can be removed from the pressing module 6, for example by using ejector rods or similar devices.

A deformation element E for establishing the forming pressure may be arranged in connection to each first mold part 3*a* and/or second mold part 3*b*. In the embodiment illustrated in FIGS. 2*b-e*, the deformation element E is attached to the first mold part 3*a*. By using a deformation element E, the forming pressure may be configured as an isostatic forming pressure.

The first mold part 3*a* and/or the second mold part 3*b* may comprise the deformation elements E, and the deformation elements E are configured for exerting the forming pressure on the cellulose blank structure 2 in the forming cavities C during forming of the cellulose products 1. The deformation elements E may be attached to the first mold part 3*a* and/or the second mold part 3*b* with suitable attachment means, such as for example glue or mechanical fastening members. During the forming of the cellulose products 1, the deformation elements E are deformed to exert the forming pressure on the cellulose blank structure 2 in the forming cavities C and through deformation of the deformation elements E, an even pressure distribution is achieved even if the cellulose products 1 are having complex three-dimensional shapes or if the cellulose blank structure 2 is having a varied thickness. To exert a required forming pressure on the cellulose blank structure 2, the deformation elements E are made of a material that can be deformed when a force or pressure is applied, and the deformation elements E are suitably made of an elastic material capable of recovering size and shape after deformation. The deformation elements E may further be made of a material with suitable properties that is withstanding the high forming pressure and forming temperature TF levels used when forming the cellulose products 1.

Certain elastic or deformable materials have fluid-like properties when being exposed to high pressure levels. If the deformation elements E are made of such a material, an even pressure distribution can be achieved in the forming process, where the pressure exerted on the cellulose blank structure 2 in the forming cavity C from the deformation elements E is equal or essentially equal in all directions between the mold parts. When each deformation element E under pressure is in its fluid-like state, a uniform fluid-like pressure distribution is achieved. The forming pressure is with such a material thus applied to the cellulose blank structure 2 from all directions, and the deformation element E is in this way during the forming of the cellulose products 1 exerting an isostatic forming pressure on the cellulose blank structure 2. Each deformation element E may be made of a suitable structure of elastomeric material or materials, and as an example, the deformation element E may be made of a massive structure or an essentially massive structure of gel materials, silicone rubber, polyurethane, polychloroprene, or rubber with a hardness in the range 20-90 Shore A.

Further, in the embodiment illustrated in FIGS. 1*a-b*, the product forming unit U comprises a blank recycling module 7 for recycling cellulose fibers. The blank recycling module 7 is configured for feeding residual parts 2*a* of the cellulose blank structure 2 after forming of the cellulose products 1, from the pressing module 6 back to the blank dry-forming module 4. The blank recycling module 7 is arranged for transporting residual cellulose blank fiber material from the pressing module 6 to the mill 4*a*. After forming of the cellulose products 1 in the forming molds 3, there may be residual parts 2*a* of the cellulose blank structure containing cellulose blank fiber material. With the blank recycling module 7, the residual or remaining cellulose fibers can be recycled and re-used for forming a new cellulose blank structure 2 together with fibers from the cellulose raw material. In FIGS. 1*a-b*, an example embodiment of a blank recycling module 7 is schematically illustrated. The blank recycling module 7 comprises a feeding structure 7*a*, such as feeding belts, a conveyer structure, or other suitable means for transporting the residual parts 2*a* from the forming molds 3 to the mill 4*a*. The mill 4*a* may be arranged with a separate inlet opening for the residual material, where the residual parts 2*a* of the cellulose blank structure 2 are fed into the mill 4*a*.

Figure 3A:
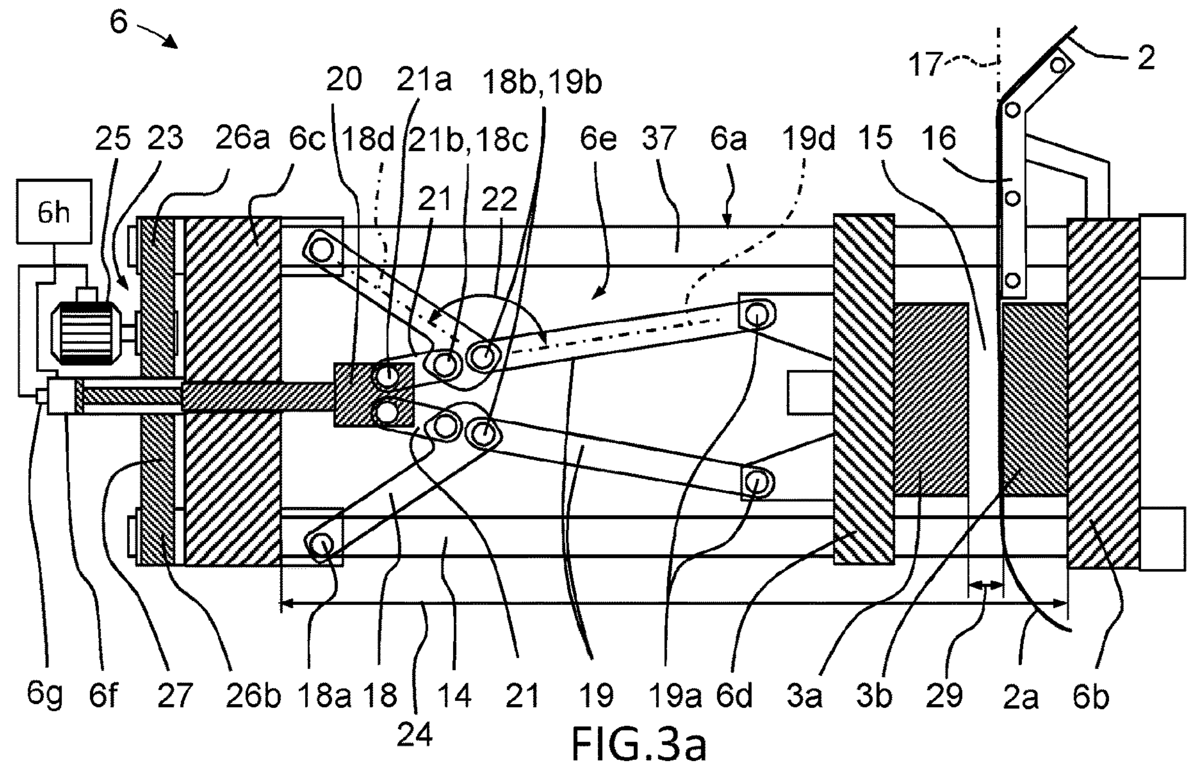
FIG. 3*a*-*b* show schematically side views of the pressing module according to the disclosure.
Figure 3B:
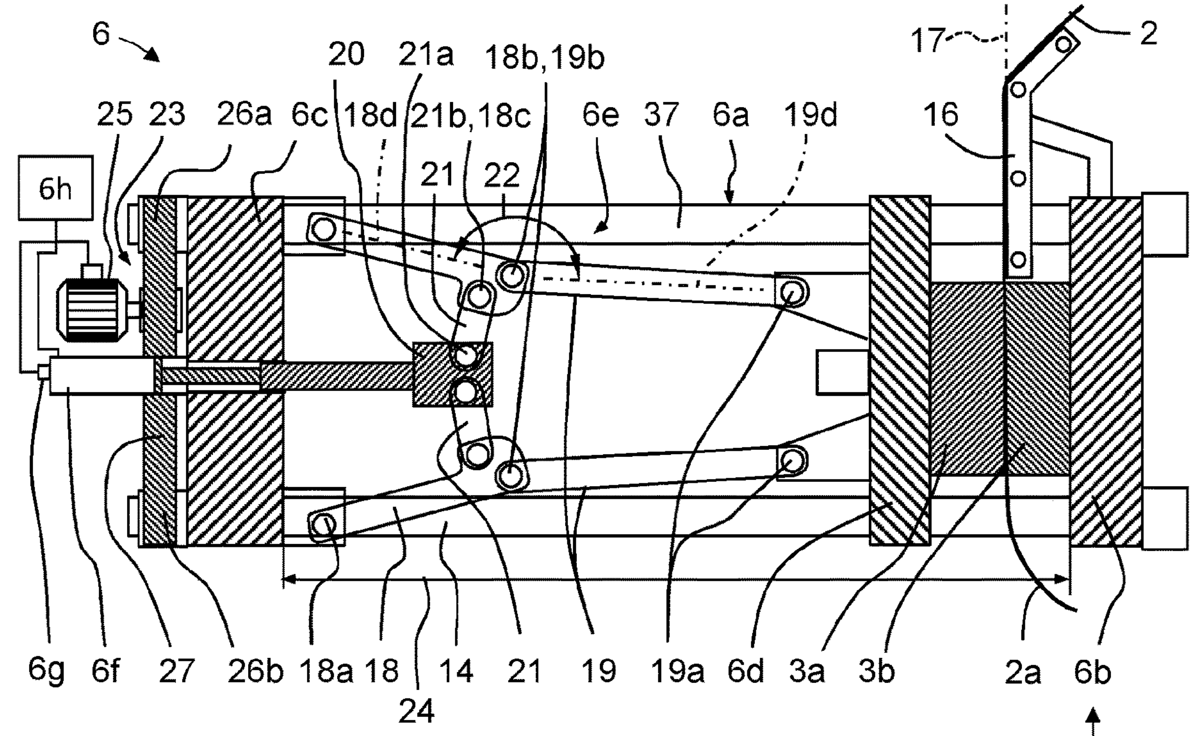

Some example embodiments of the pressing module 6 are described more in detail below with reference to the schematic drawings in FIGS. 2*a* and 3*a-b*, wherein FIG. 3*a* shows the toggle press 6*a* in an open state with a mold gap 29 of about may be 20-100 mm, or the like, depending on type of material and product, and FIG. 3*b* shows the same toggle press 6*a* during a pressing action, i.e. with a mold gap 29 of about 0.5-3 mm, depending on type of material and product.

The pressing module 6 is a cellulose product toggle pressing module 6 for forming non-flat cellulose products 1 from an air-formed cellulose blank structure 2. The toggle pressing module 6 comprises a toggle press 6*a* including pressing member 6*d* movably arranged in a pressing direction Dp, a toggle-mechanism 6*e* drivingly connected to the pressing member 6*d*, a pressing actuator arrangement 6*f* drivingly connected to the toggle-mechanism 6*e*, and an electronic control system 6*h* operatively connected to the pressing actuator arrangement 6*f*. The toggle pressing module 6 further comprises a forming mold 3 including a moveable first mold part 3*a* attached to the pressing member 6*d* and a stationary second mold part 3*b*. The electronic control system 6*h* is configured for controlling operation of the pressing actuator arrangement 6*f* for driving the pressing member 6*d* using the toggle-mechanism 6*e* in the pressing direction Dp and forming the non-flat cellulose products 1 from the air-formed cellulose blank structure 2 by pressing the first mold part 3*a* against the stationary second mold part 3*b*. The toggle press 6*a* is installed with, or arranged for being installed with, the pressing direction Dp of the pressing member 6*d* arranged primarily in a horizontal direction DH, specifically with the pressing direction Dp of the pressing member 6*d* arranged within 20 degrees from the horizontal direction DH, and more specifically with the pressing direction Dp in parallel with the horizontal direction DH.

The cellulose product toggle pressing module 6 is particularly suitable for forming non-flat cellulose products 1 from an air-formed continuous cellulose blank structure 2, because a continuous cellulose blank structure 2 enables simplified handling and feeding of the blank structure 2 to the toggle press 6*a*, as well as simplified feeding of residual parts 2*a* of the cellulose blank structure 2 to the blank recycling module 7. However, the cellulose product toggle pressing module 6 is also suitable for forming non-flat cellulose products 1 from an air-formed non-continuous cellulose blank structure 2, such as individual sheet pieces of air-formed cellulose blank structures 2.

The pressing actuator arrangement 6*f* may for example include a single or a plurality of hydraulic or pneumatic linear actuators, such as cylinder-piston actuators. Alternatively, a motor with a rotating output shaft, such as an electric, hydraulic or pneumatic motor may be used for driving a mechanical actuator, in particular a linear mechanical actuator, such as a ball screw, threaded rod actuator, rack and pinion actuator, etc. Still more alternatively, the pressing actuator arrangement 6*f* may include a high-torque electric motor that is drivingly connected to the toggle-mechanism 6*e* via a rotary-to-linear transmission device, such as an eccentric mechanism or a crankshaft arrangement. Even furthermore alternatively, the pressing actuator arrangement 6*f* may include one or more high-torque electric motors that are integrally mounted in the toggle-mechanism 6*e* and directly drivingly connected with a rotating member or pivoting link of the toggle-mechanism 6*e*.

The moveable first mold part 3*a* may be directly or indirectly attached to the pressing member 6*d*. This means that there may for example be an intermediate member arranged between moveable first mold part 3*a* and the pressing member 6*d*, for example a load cell for detecting pressing force, or the like.

The stationary second mold part 3*b* is typically stationary during the pressing action but may nevertheless be adjustable in the pressing direction Dp in the time period between consecutive pressing actions, as will be described more in detail below.

In some example embodiments, the toggle press 6*a* includes a front structure 6*b* and a rear structure 6*c*, wherein the toggle-mechanism 6*e* is connected also to the rear structure 6*c*, and wherein the stationary second mold part 3*b* is attached to the front structure 6*b*.

The stationary second mold part 3*b* may be directly or indirectly attached to the front structure 6*b*. This means that there may for example be an intermediate member arranged between stationary second mold part 3*b* and the front structure 6*b*, for example a load cell for detecting pressing force, or the like.

The front and rear structures 6*b*, 6*c* of the toggle press 6*a* represent two rigid and structurally relevant parts that must be interconnected by some kind of structurally rigid construction for ensuring that the front and rear structures 6*a*, 6*c* do not separate from each other during pressing action. The front and rear structures 6*b*, 6*c* may have many different forms, depending on the specific circumstance. For example, the front and rear structures 6*b*, 6*c* may have a plate-like shape, in particular rectangular plate-like shape, thereby enabling cost-effective manufacturing and the possibility of using the corner regions of the plate-shaped front and rear structures 6*b*, 6*c* for attachment to a common rigid frame structure.

In fact, the toggle press 6*a* typically comprises a rigid frame structure defined by the front structure 6*b*, the rear structure 6*c* and an intermediate frame structure that connects the front structure 6*b* with the rear structure 6*c*.

In some example embodiments, the toggle press 6*a* comprises a rigid frame structure defined by the front structure 6*b*, the rear structure 6*c* and an intermediate linear guiding arrangement 14 that connects the front structure 6*b* with the rear structure 6*c*, wherein the pressing member 6*d* is movably attached to the linear guiding arrangement 14 and moveable in the pressing direction Dp. The rigid frame structure may be position on an underlying support frame 38 for providing the desired height and angular inclination of the toggle pressing module 6.

In other words, the intermediate frame structure may be provided by an intermediate linear guiding arrangement 14 that has a dual functionality in terms of providing structural strength and rigidity to the toggle press 6*a*, providing a rigid connection between the front and rear structure 6*b*, 6*c*, and additionally providing an intermediate linear guiding arrangement 14 for guiding of the pressing member 6*d*.

For enabling cost-effective and strong frame structure of the toggle press 6*a*, the intermediate linear guiding arrangement 14 may comprises four tie bars 37, of which one is arranged in each corner region of the plate-shaped front and rear structure 6*b*, 6*c*. The tie bars are for example cylindrical and corresponding cylindrical holes may be provided in the corner regions of the plate-shaped front and rear structure 6*b*, 6*c* for receiving said tie bars.

The pressing member 6*d* may have any structural shape. However, in some example embodiments, also the pressing member has at least partly a plate-like shape, in particular a rectangular plate-like shape, thereby enabling cost-effective manufacturing and the possibility of using the corner regions of the plate-shaped pressing member 6*d* for attachment to the intermediate linear guiding arrangement 14. Hence, the toggle press 6*a* may in some example embodiments be referred to as a three platen press.

The toggle press 6*a* is for example installed with the pressing direction Dp of the pressing member 6*d* arranged in the horizontal direction, as illustrated in FIGS. 1*a-b*, 2*a* and 3*a-b*. However, with reference to FIGS. 5*a-b*, the beneficial aspects of enabling a compact overall design of the cellulose product forming unit U, with a low build-height, is also obtainable when the toggle press 6*a* is installed in a slightly inclined state, depending on the circumstances. Consequently, the beneficial aspects of the cellulose product toggle pressing module 6 may be deemed obtainable with the toggle press 6*a* arranged with the pressing direction Dp of the pressing member 6*d* arranged primarily in a horizontal direction DH, i.e. with the pressing direction Dp of the pressing member 6*d* arranged more in a horizontal direction DH than vertical direction Dy. In other words, the toggle press 6*a* may be installed with the pressing direction Dp of the pressing member 6*d* arranged with an installation angle 13 in the range of 0-44 degrees, in particular in the range of 0-20 degrees, wherein said installation angle is defined by the pressing direction Dp and the horizontal direction DH.

Figure 5A:
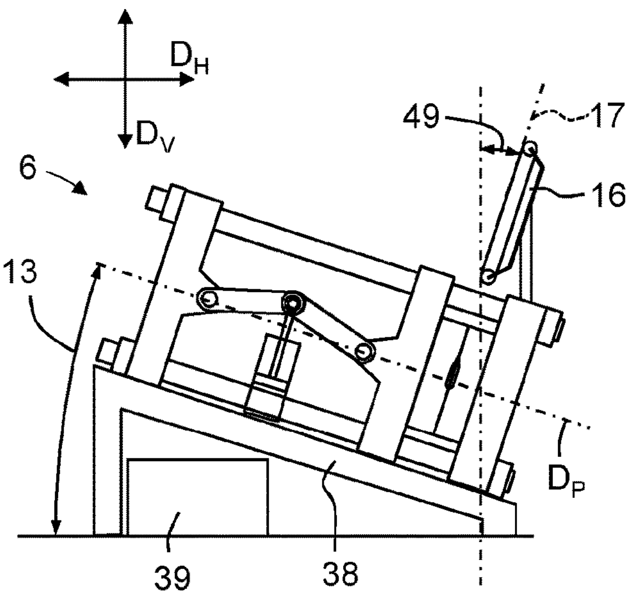
FIG. 5*a*-*b* show schematically side views of alternative orientations of the pressing module according to the disclosure.
Figure 5B:
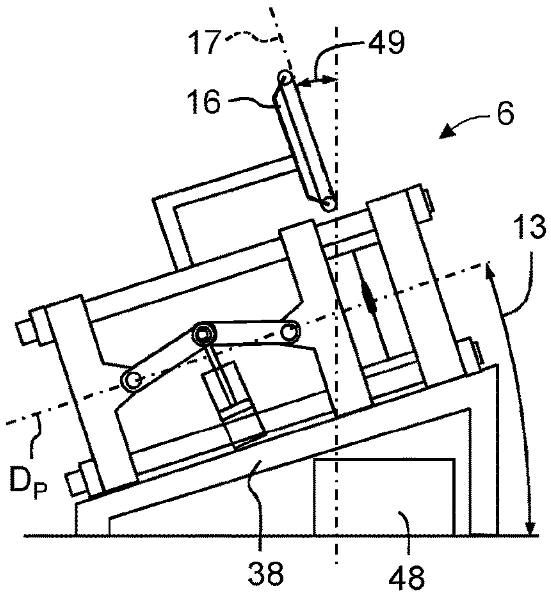

Furthermore, as illustrated in FIGS. 5*a-b*, the beneficial aspect of enabling a compact overall design of the cellulose product forming unit U, and a low build-height, is obtainable both when the rear structure 6*c* of the toggle press 6*a* is located higher up than the front structure 6*b* of the toggle press, as illustrated in FIG. 5*a*, and when the front structure 6*b* of the toggle press 6*a* is located higher up than the rear structure 6*c* of the toggle press, as illustrated in FIG. 5*b*. Just as an example, in FIG. 5*a* a power source 39 for the pressing actuator arrangement 6*f* is illustrated installed under the support frame 38, and in FIG. 5*b* for example a product plundering arrangement 48 is illustrated installed under the support frame 38.

In some example embodiments, the toggle press 6*a* further includes a feeding device 16 for feeding continuous or discontinuous air-formed cellulose blank structure 2 into a pressing area 15 located between the first and second mold parts 3*a*, 3*b*, wherein the feeding device 16 is arranged for feeding the air-formed cellulose blank structure 2 primarily vertically downwards into the pressing area 15, specifically for feeding the air-formed cellulose blank structure 2 downwards with a feeding angle 49 of less than 20 degrees from a vertical direction into the pressing area 15, and more specifically for feeding the air-formed cellulose blank structure vertically downwards into the pressing area 15.

As described above, the term primarily vertically here means feeding the blank structure in a direction that is arranged more vertical than horizontal. In other words, a linear part of the feeding device 16 is oriented for defining an angle 49 with a vertical direction in the range of 0-44 degrees, in particular 0-20 degrees. Consequently, the feeding device 16 may be deemed being located primarily above the forming mold 3.

Moreover, the laid-down arrangement of the pressing module 6, such that the pressing direction Dp is oriented primarily in the horizontal direction DH, also results in that a plane defined by interior, typically substantially flat, side surfaces of the first and second mold parts 3*a-b* is arranged primarily in the vertical direction Dv, i.e. defining an angle in the range of 0-44 degrees, in particular 0-20 degrees, to the vertical direction Dv. The interior flat side surfaces of the first and second mold parts 3*a-b* refers to those surfaces of the first and second mold parts 3*a-b* that face each other and surround the pressing surfaces of the pressing cavity.

According to some example embodiments, the feeding device 16 for feeding the air-formed cellulose blank structure 2 into the pressing area 15 may include an elongated vacuum belt feeder or an elongated tractor belt feeder or the like, and with a direction of elongation 17 of the belt portion of the feeding device 16 arranged primarily in a vertical direction Dv, specifically arranged with a direction of elongation 17 within 20 degrees from the vertical direction Dv, and more specifically arranged in parallel with the vertical direction Dy.

The toggle-mechanism 6*e* of the toggle press 6*a* may have a large variety of designs and implementations. The basic requirement of the toggle-mechanism 6*e* is to generate a pressing force amplification, thereby enabling the use of a relatively low-cost and low-capacity pressing actuator arrangement 6*f* in term of pressing force. The pressing force amplification is accomplished by a corresponding reduction of pressing speed of the pressing module. Hence, the toggle-mechanism 6*e* amplifies and slows down a pressing force/speed compared with the force/speed of the pressing actuator arrangement 6*f*.

In general, and with reference to the example embodiment of FIGS. 1*a-b*, 2*a* and 3*a-b*, the toggle-mechanism 6*e* includes a first link member 18 and a second link member 19, wherein the pressing actuator arrangement 6*f* is directly or indirectly drivingly connected to the first or second link member 18, 19, such that actuation of the pressing actuator arrangement 6*f* results in motion of the pressing member 6*d*.

More in detail, the toggle-mechanism 6*e* may in some example embodiments include a first link member 18 and a second link member 19, each having first and second pivot connections 18*a*, 18*b*, 19*a*, 19*b*, wherein the first pivot connection 18*a* of the first link member 18 is pivotally connected to the rear structure 6*c*, wherein the first pivot connection 19*a* of the second link member 19 is pivotally connected to the pressing member 6*d*, wherein the second pivot connection 18*b* of the first link member 18 is pivotally connected to the second pivot connection 19*b* of the second link member 19, and wherein the pressing actuator arrangement 6*f* is directly or indirectly drivingly connected to the first or second link member 18, 19 for adjusting a level of alignment between the first and second link members 18, 19, such that actuation of the pressing actuator arrangement 5*f* results in motion of the pressing member 6*d*.

The fact that the second pivot connection 18*b* of the first link member 18 is pivotally connected to the second pivot connection 19*b* of the second link member 19 means that the second pivot connection 18*b* of the first link member 18 is the same as the second pivot connection 19*b* of the second link member 19.

The effect of adjusting a level of alignment between the first and second link members 18, 19 is illustrated in FIG. 3*a-b*. The alignment between the first and second link members 18, 19 is determined by an alignment angle 22 defined by longitudinal directions of the first and second link members 18, 19, as seen in a side-view according to FIGS. 3*a* and 3*b*, wherein the longitudinal direction 18*d* of the first link member 18 is defined by a straight line passing the first and second pivot connections 18*a*, 18*b* of the first link member, and the longitudinal direction 19*d* of the second link member 19 is defined by a straight line passing the first and second pivot connections 19*a*, 19*b* of the second link member 19. Clearly, the alignment angle 22 is smaller in FIG. 3*b* than in FIG. 3*a*, thereby confirming that actuation of the pressing actuator arrangement 5*f* results in forwards motion of the pressing member 6*d*, i.e. a motion of the pressing member 6*d* towards the front structure 6*b*.

The toggle mechanism 6*e* illustrated in the example embodiment of FIG. 3*a-b* may be referred to as five-point double-toggle mechanism, meaning that there are two individual toggle mechanisms arranged side-by-side for providing a better force pressing force distribution to the pressing member 6*d*, and wherein each of said two individual toggle mechanisms include five pivot points.

Specifically, in the example embodiment of FIG. 3*a-b*, the pressing actuator arrangement 6*f* is drivingly connected to a single cross head 20, and a cross head link member 21 has a first connection 21*a* that is pivotally connected to the cross head link member 21 and a second connection 21*b* that is pivotally connected to a third pivot connection 18*c* of the first link member 18.

In other words, the toggle mechanism 6*e* of the example embodiment of FIGS. 3*a-b* comprises a single cross head that drives a first and second individual toggle mechanisms arranged side-by-side, each including a first link member 18, a second link member 19 and a cross head link member 21, wherein the first link member 18 pivotally connected to a second link member 19 and to the rear structure 6*c*, wherein the second link member 19 is pivotally connected to the pressing member 6*d*, wherein the cross head link member 21 is pivotally connected to the first link member 18 and the cross head 20.

Many alternative designs of the toggle-mechanism 6*e* are possible within the scope of the disclosure. For example, the cross head link member 21 may be pivotally connected to the second link member 19 and the cross head 20. Furthermore, the second and third pivot connections 18*b* 18*c* of the first link member 18 may alternatively be a common pivot connection.

Moreover, the toggle mechanism 6*e* may be three-point single-toggle mechanism as illustrated in FIG. 5*a*, wherein the toggle-mechanism 6*e* includes a first link member 18 pivotally connected to a second link member 19, wherein the first link member 18 is also pivotally connected rear structure 6*c* and the second link member 19 is pivotally connected to the front structure 6*d*, and a pressing actuator arrangement 6*f* is directly or indirectly drivingly connected to the first or second link member 18, 19, such that actuation of the pressing actuator arrangement 6*f* results in motion of the pressing member 6*d*.

Figure 6A:
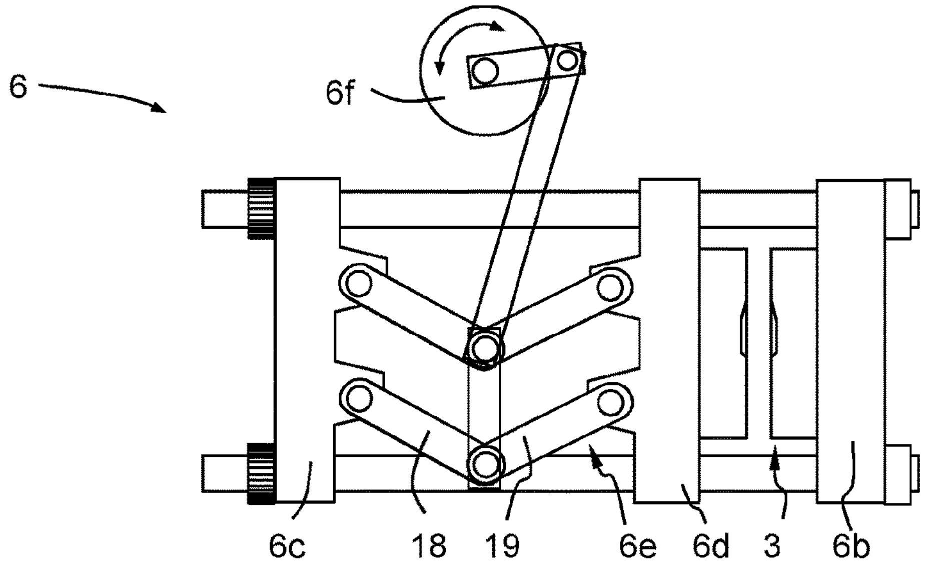
FIG. 6*a*-*b* show schematically side views of alternative designs of the toggle mechanism according to the disclosure.

Still a further example design of the toggle-mechanism 6*e* is schematically illustrated in FIG. 6*a*, which shows a three-point double-toggle mechanism, i.e. two three-point single-toggle mechanisms as described with reference to FIG. 5*a*, and with a pressing or pulling actuator arrangement 6*f* directly or indirectly drivingly connected to the first and/or second link member 18, 19 of both said single-toggle mechanisms. Moreover, in this example embodiment, an electric servo motor is depicted as actuator arrangement 6*f*.

Figure 6B:
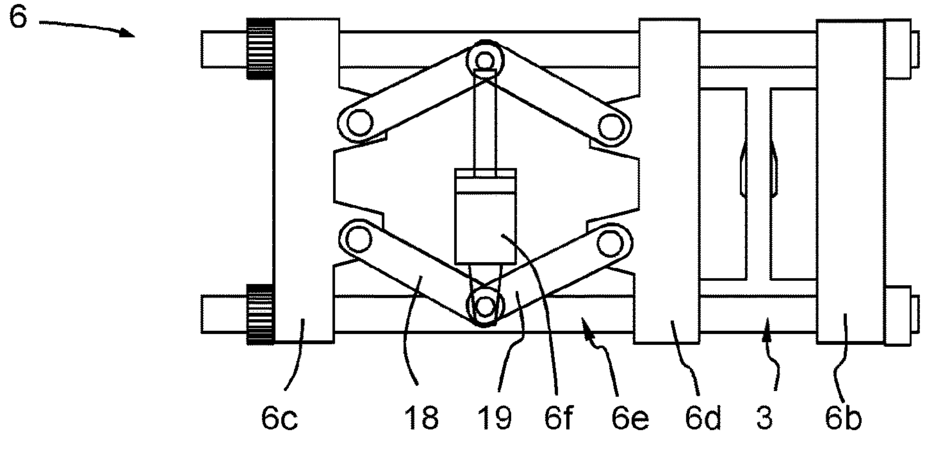

According to yet a further example embodiment, the toggle-mechanism 6*e* as schematically illustrated in FIG. 6*b* includes a three-point double-toggle mechanism, i.e. two three-point single-toggle mechanisms as described with reference to FIG. 5*a*, but here operating in opposite directions and with an actuator arrangement 6*f* arranged between, and directly or indirectly drivingly connected to, the first and/or second link member 18, 19 of both said single-toggle mechanisms.

With reference again to FIG. 3*a-b*, in some example embodiments, the toggle press 6*a* further includes the front structure 6*d* and the rear structure 6*c*, wherein the toggle-mechanism 6*e* is connected to the rear structure 6*c*, wherein the stationary second mold part 3*b* is attached to the front structure 6*b*, and wherein the toggle press 6*a* further includes a mechanical adjustment mechanism 23 for enabling adjustment of a distance 24 between the front structure 6*b* and rear structure 6*c* in the pressing direction Dp, and an adjustment actuator arrangement 25 configured for driving the mechanical adjustment mechanism 23.

For example, the mechanical adjustment mechanism 23 may comprise four gear wheels 26*a-d*, each having internal thread for threading mounting on a correspondingly threaded end portion of a tie bar of the linear guiding arrangement 14, and each 26*a-d* having external gear teeth for being driven by one or more motors of the adjustment actuator arrangement 25.

For example, as illustrated in FIGS. 2*a* and 3*a-b*, each of said four gears 26*a-d* of the mechanical adjustment mechanism 23 may be in contact with, and driven by, a single central gear wheel 27, which is powered by a single motor of the adjustment actuator arrangement 25.

Operation of the adjustment actuator arrangement 25 causes the mechanical adjustment mechanism 23 to alter the distance 24 between front and rear structure 6*b*, 6*c*, thereby influencing the amplification level and operating behavior of the toggle-mechanism.

In the example embodiment of FIG. 3*a-b*, operation of the mechanical adjustment mechanism 23 displaces the rear structure 6*c* relative to the linear guiding arrangement 14 for altering the distance 24 between front and rear structure 6*b*, 6*c*.

Alternatively, operation of the mechanical adjustment mechanism 23 displaces the front structure 6*b* relative to the linear guiding arrangement 14 for altering the distance 24 between front and rear structure 6*b*, 6*c*.

Such adjustment in the distance between front and rear structure 6*b*, 6*c* is typically performed in the time period between consecutive pressing actions of the toggle press 6*a*.

Figure 4:
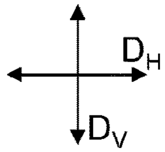
FIG. 4 shows the main process steps of a pressing cycle.
Figure 4:
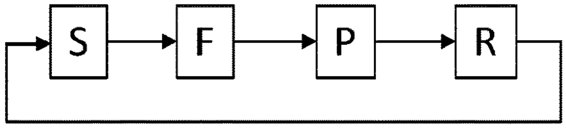

FIG. 4 schematically shows the main process steps of the pressing module 6 during normal operation. The pressing operation flowchart typically starts with the pressing member in stillstand at a standby position S associated with retracted toggle mechanism and open pressing mold 3, as schematically illustrated in FIG. 3*a*. Upon receiving a command or instruction to initiate a pressing cycle, the second step F of the flow chart is performed, which involves activating the pressing actuator arrangement 6*f* for pushing the pressing member 6*d* forwards F, until the forming mold 3 becomes closed and a forming pressure of about 1-100 Mpa, in particular 4-20 Mpa, is applied to the cellulose blank structure in a third step P of the main process. Thereafter, the fourth step R of the flow chart is performed, which involves initiating a return motion of the pressing member 6*d* towards the start position, i.e. the standby position S.

In case of high speed manufacturing, the process may skip step S, i.e. skip returning completely to the standby position S before initiating the second step F of the flow chart again.

Figure 7A:
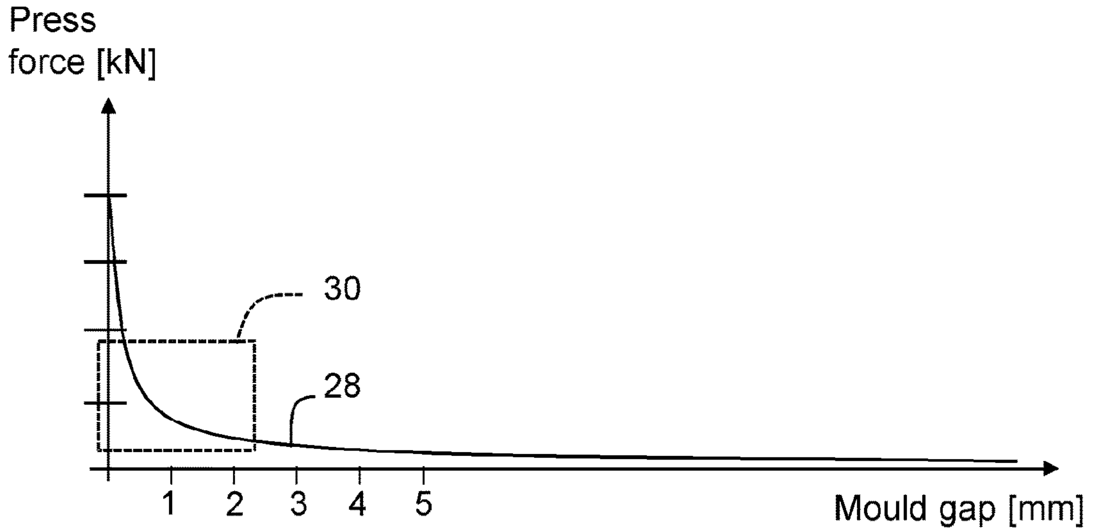
FIG. 7*a*-*e* show schematically plotted pressing force curves representing various example control strategies according to the disclosure.

FIG. 7*a* schematically illustrates the typical highly exponential amplification characteristics of an example embodiment of a toggle press 6*a*. Specifically, FIG. 7*a* shows a plotted press force curve in a coordinate system having press force in Newton (N) at the Y-axis and mold gap in millimeters of the forming mold 3 at the X-axis. This specific example is merely included for describing an example embodiment of the cellulose product toggle pressing module and corresponding method and should not be construed as limiting in any manner, especially not in terms of the example mold gap data. Moreover, different types of toggle mechanisms provide different levels of exponential amplification characteristics and an appropriate type of toggle mechanism may be selected for each specific cellulose product and/or cellulose blank structure 2.

A maximal press force curve 28 is illustrated in FIG. 7*a*. This curve represents the maximal press force of a specific toggle press 6*a* is capable of delivering at a specific setting of the distance 24 between the front and rear structure 6*b*, 6*c* as a function of the mold gap, in particular at a setting when a zero mold gap is accomplished exactly when the first and second link member becomes aligned, which in theory results in infinite press force, as can be seen by the asymptotic characteristic of the maximal press force curve 28 in FIG. 7*a*.

When operating the toggle press in the asymptotic area of the press force curve 28, i.e. when the first and second link members 18, 19 are nearly or completely aligned and the alignment angle 22 is nearly or exactly 180 degrees, there toggle press has a large sensitivity in terms of press force as a function of toggle mechanism input force from the pressing actuator arrangement 6*f*, due to the asymptotic amplification characteristic in this area.

The term maximal stroke state is used hereinafter and it refers to the maximal forward position obtainable by the toggle mechanism when not being obstructed by the forming mold, the cellulose blank structure or other part, e.g. the aligned state of the first and second link members 18, 19 of the example embodiment of FIGS. 3*a-b*, the bottom dead center (BDC), or as the operating state illustrated in FIG. 8*c*.

Figure 7B:
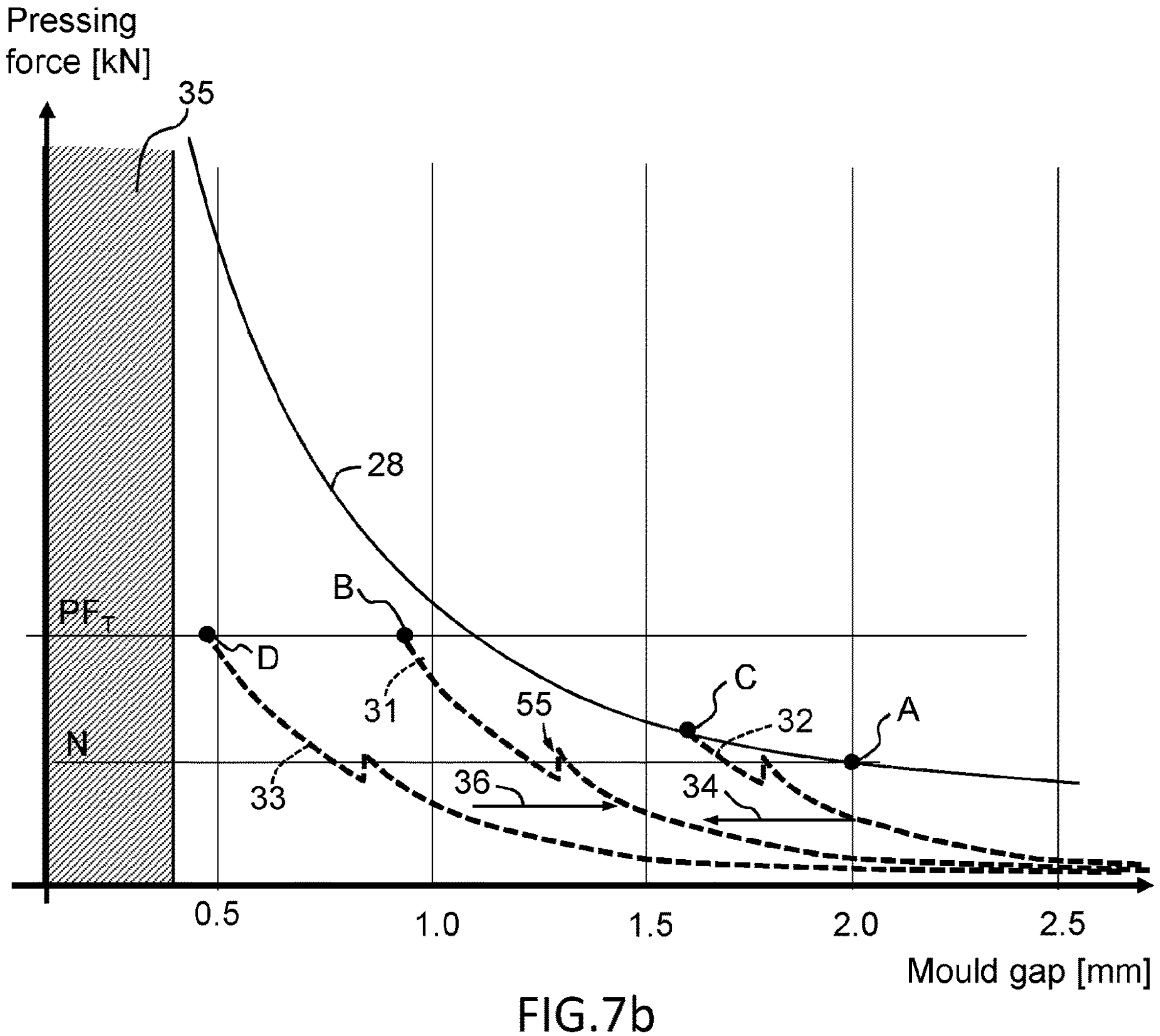

An operating window 30 of the toggle press 6*a* may for example correspond to the dashed rectangular window in the graph of FIG. 7*a*, and a magnification of said operating window 30 is showed in FIG. 7*b*, including said maximal press force curve 28.

The maximal press force curve 28 indicates for example that the maximal press force deliverable for example at point A, which corresponds to a 2.0 mm mold gap, is N Newton. The maximal press force curve 28 as a function of the mold gap, for a certain distance 24 between front and rear structure 6*b*, 6*c*, may for example be derivable by inserting a plurality of non-compressible plates, such as a steel plates, with gradually changing thickness, and detecting the maximal pressure exerted by the toggle press for each plate by means of a suitable press force detecting arrangement, such as a load cell, strain gauge force sensor, or the like. In this example illustration, the maximal press force curve 28 is determined having the toggle press adjusted such that the first and second link members 18, 19 arrive at 180 degrees alignment angle 22, or the toggle mechanism 6*e* reaches the maximal stroke state, upon reaching zero mold gap 29.

The central press force-mold gap curve 31 in FIG. 7*b* may for example represent the pressing of a first type of cellulose blank structure 2. The low density and resilience of the first type of cellulose blank structure 2 results in a steeper increase in press force first at about 1.5 mm mold gap (thickness of cellulose product), and at about 0.9 mm mold gap (thickness of cellulose product), a target press force $PF_T$ is reached at point B, at which the pressing motion of the pressing member 6*d* may be stopped. The target press force $PF_T$ may here correspond to a target forming pressure of may be in about 4-20 Mpa.

The central press force-mold gap curve 31, and all other press force-mold gap curves illustrated in the present disclosure, have a relatively smooth and continuous character except for a relatively small step-like decrease 55 in the press force at an intermediate position, which corresponds to the above-mentioned cutting operation in the pressing module 6, where the cellulose products 1 are separated from the cellulose blank structure 2 during forming of the cellulose products 1, because the mold parts may have integrated cutting devices. However, if such cutting would be performed in a separate product cutting operation, i.e. separate from the forming operation, the press force-mold gap curves would not include such step-like decrease 55 in the press force curve.

However, the specific example toggle press 6*a* schematically described with reference to FIG. 7*b* has a relatively narrow operating region, such that when the cellulose blank structure 2 being fed into the forming mold is for example thicker and/or made of a more densely compressed fiber material, the forming process follows the right-side press force-mold gap curve 32 in FIG. 7*b*, which curve 32 represents pressing of a second type of cellulose blank structure 2. The relatively high density and thickness of the second type of cellulose blank structure 2 results in a steeper increase in press force already at about 2.5 mm mold gap (thickness of cellulose product), and at about 1.1 mm mold gap (thickness of cellulose product), the pressing member 6*d* stops moving forward at point C because the toggle press has reached its maximal press force deliverable at this mold gap. In other words, the target press force $PF_T$ is not reached at point C.

Consequently, for successful forming of cellulose products based on the second type of cellulose blank structure 2, the adjustment actuator arrangement 25 must be operated to adjust the distance 24, in particular to increase the distance 24, between front and rear structure 6*b*, 6*c*, thereby effectively displacing the right-side press force-mold gap curve 32 in FIG. 7*b* in the direction of the first arrow 34 to a new position resembling the position of the central press force-mold gap curve 31. As a result, the second type of cellulose blank structure 2 may be properly compressed and formed, and the target press force $PF_T$ may be reached at about point B, at which the pressing motion of the pressing member 6*d* may be stopped, despite that the second type of cellulose blank structure 2 has a relatively high density and thickness.

Similarly, when the cellulose blank structure 2 being fed into the forming mold is for example thinner and/or made of a less densely compressed fiber material, the forming process follows the left-side press force-mold gap curve 33 in FIG. 7*b*, which curve 33 represents pressing of a third type of cellulose blank structure 2. The relatively low density and thickness of the third type of cellulose blank structure 2 results in a steeper increase in press force first at about 1.0 mm mold gap (thickness of cellulose product), and at about 0.5 mm mold gap (thickness of cellulose product), a target press force $PF_T$ is reached at point D. However, due to said relatively narrow operating region of the specific example toggle press 6*a* schematically described with reference to FIG. 7*b*, the operating point D is located relatively close the asymptotic area 35 of the toggle press, thereby possibly rending more difficult to control and obtain the desired target press force $PF_T$. In other words, it may be beneficial to adjust the distance 24, in particular reduce the distance 24, between front and rear structure 6*b*, 6*c*, thereby effectively displacing the left-side press force-mold gap curve 33 in FIG. 7*b* in the direction of the second arrow 36 to a new position resembling the position of the central press force-mold gap curve 31, for the purpose of reducing the risk of unintentional over-compression or of the cellulose product. As a result, also the third type of cellulose blank structure 2 may be properly compressed and formed in a more easily controllable operating area, i.e. in a less sensitive and force amplified operating area, and the target press force $PF_T$ may be reached at about point B, at which the pressing motion of the pressing member 6*d* may be stopped, despite that the third type of cellulose blank structure 2 has a relatively low density and thickness.

In other words, adjustment of the adjustment actuator arrangement 25 between front and rear structure 6*b*, 6*c* may be beneficial and desirable, depending on the structure, thickness and density of the cellulose blank structure 2 and the forming mold 3.

The asymptotic area 35 in FIG. 7*b* is illustrated as having well-defined borders but this is merely schematic and for illustrative purposes. The asymptotic area 35 has in fact no well-defined borders, but is merely gradually decreasing with increasing distance from the maximal stroke state of the toggle mechanism 6*e*. Pressing and forming operation within the asymptotic area may in some circumstances be undesirable due to the sensitivity and difficult pressing force control in this area, but in some circumstances it may be necessary and/or planned to operate in this area, for example when a relatively small capacity toggle press is used, which can only deliver the necessary pressing force within its asymptotic area.

In some example embodiments, each of the first and second mold parts 3*a*, 3*b* comprises a main rigid plate-shaped body with a typically substantially flat surface configured for facing the other mold part, and at least one pressing surface 3*c*, 3*d* defining one or more forming cavities C for forming a cellulose product 1, and with or without additional minor parts, such as spring-loaded cutting devices and/or mold alignment devices, or the like, wherein said substantially flat surfaces of the main rigid plate-shaped body of the first and second mold forming parts 3*a*, 3*b* are free from mutual direct contact during a pressing cycle. Consequently, said surfaces of the main rigid plate-shaped bodies are not intended to come in mutual contact and to prevent further pressing motion of the first and second forming mold parts 3*a*, 3*b*. However, other parts of the first and second mold parts 3*a*, 3*b* may still be in mutual contact during the pressing action, such as spring-loaded cutting devices and/or mold alignment devices, etc., which are not part of said surfaces of the first and second mold parts 3*a*, 3*b*.

Figure 7C:
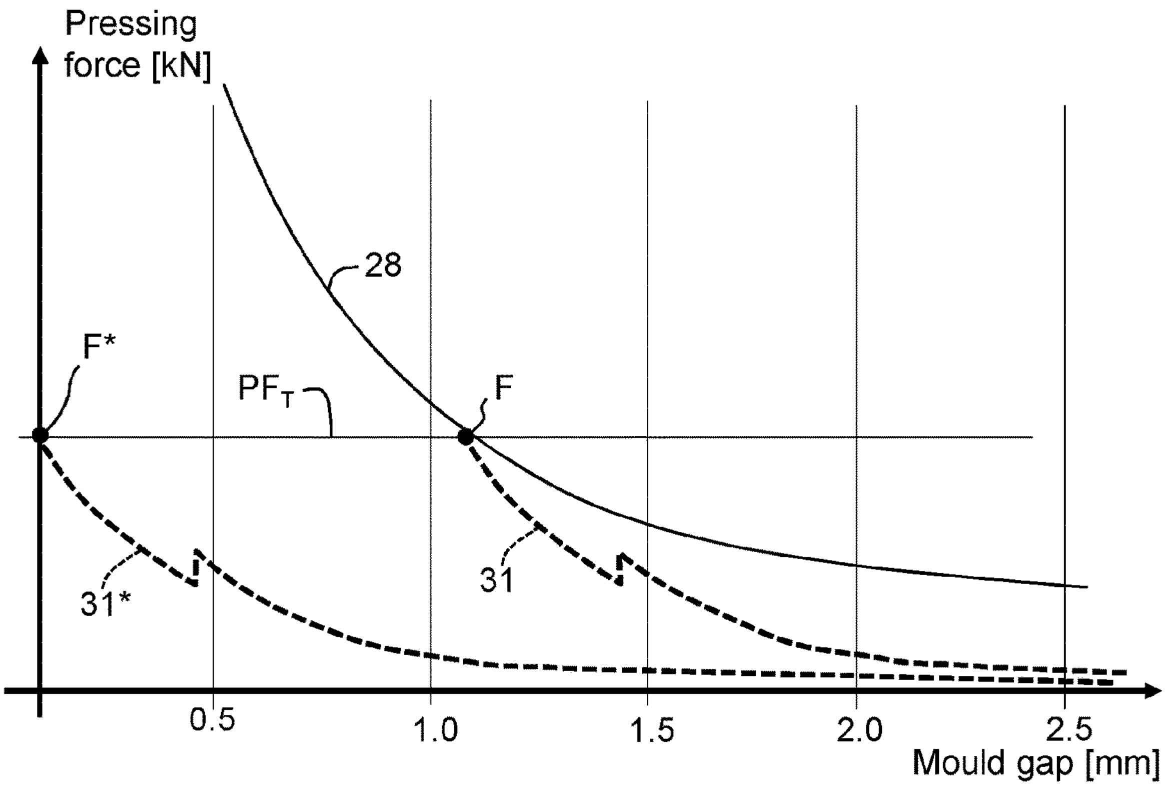

Pressing operation of the pressing module 6 may be performed in a variety of ways. For example, the toggle press 6*a* may be operated in an open loop manner, wherein no feedback of parameters such as press force or pressing member position is required, as for example schematically illustrated in FIG. 7*c*. Specifically, a combination of distance 24 between front and rear structure 6*b*, 6*c* of the toggle press 6*a* and fixed maximal pressing force of the pressing actuator arrangement 6*f* may first be adjusted to suitable values, for example manually or automatically by the electronic control system 6*h*, such that the pressing member 6*d* follows the press force-mold gap curve 31 and automatically arrives at approximately operating position F, which corresponds to target press force $PF_T$ when pressing a certain cellulose blank structure 2. In other words, the pressing actuator arrangement 6*f* may be controlled to simply deliver a certain fixed pressing force each time, and a return motion of the pressing member may be initiated after a certain time period has passed since initiating the forwards motion, or the like.

Figure 8A:
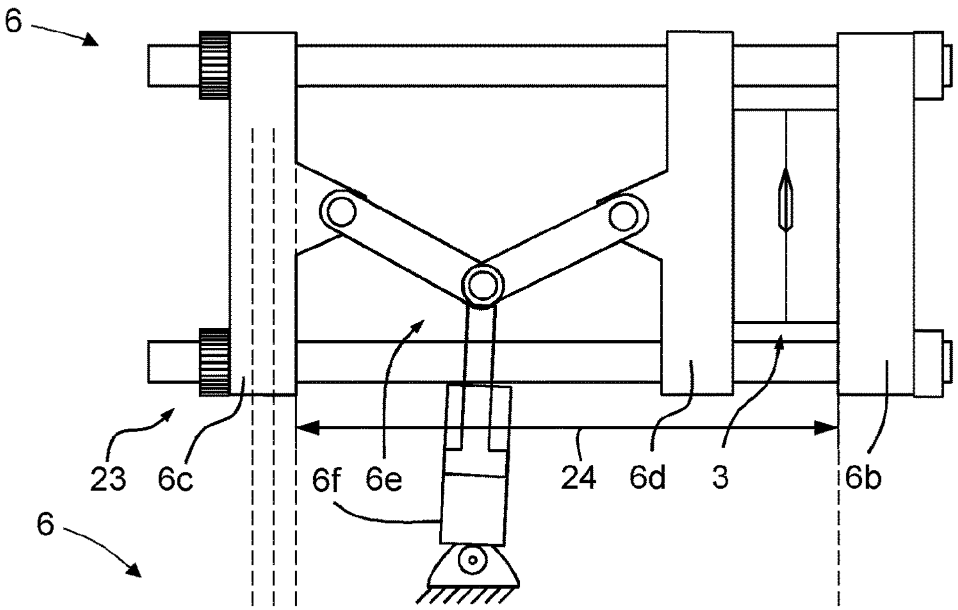
FIG. 8*a*-*c* show schematically side views of alternative operative settings of a pressing module according to the disclosure.
Figure 8B:
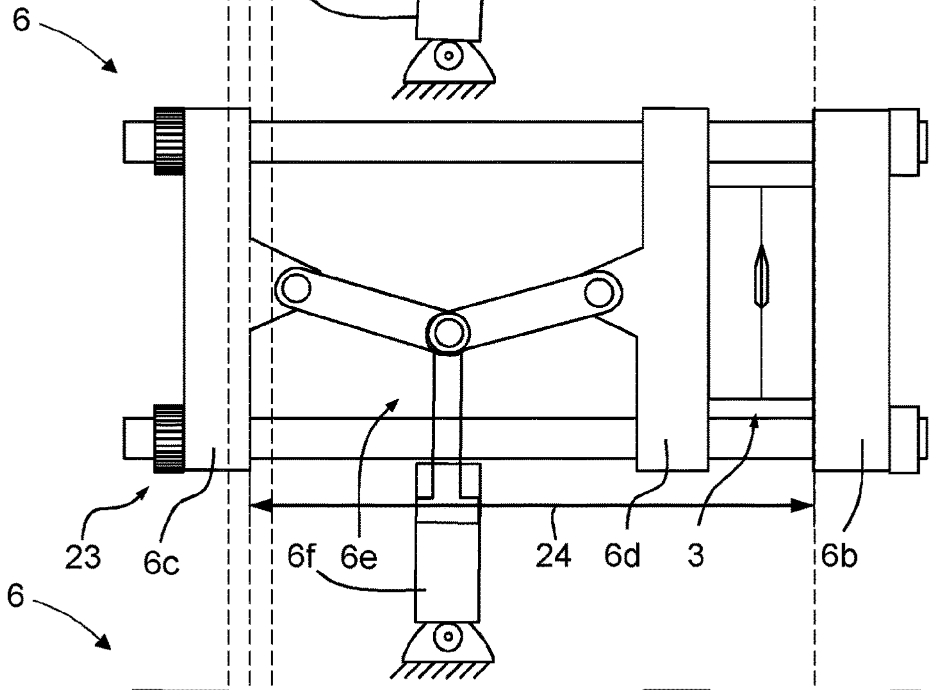
Figure 8C:
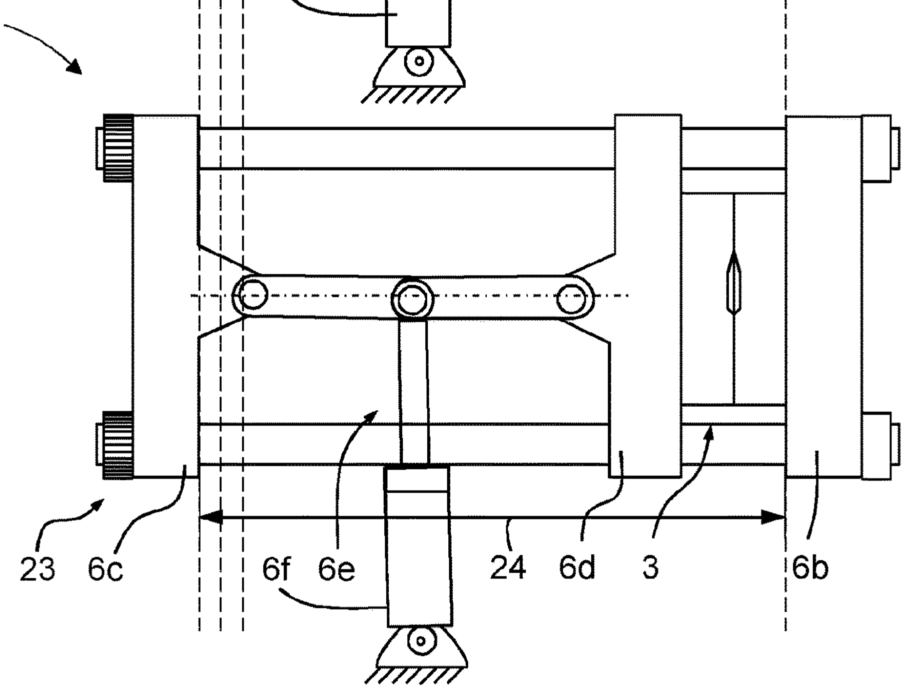

FIGS. 8*a-c* schematically illustrate how an example toggle press 6*a* may be adjusted to obtain different levels of maximal pressing force, as described above. In FIG. 8*a*, the distance 24 between front and rear structure 6*b*, 6*c* is adjusted to be relatively short, thereby providing a relatively low pressing force for a given predetermined maximal pressing force of the pressing actuator arrangement 6*f*. In FIG. 8*b*, the distance 24 between front and rear structure 6*b*, 6*c* is extended a bit, thereby providing a medium pressing force for a given predetermined maximal pressing force of the pressing actuator arrangement 6*f*, and in FIG. 8*c*, the distance 24 between front and rear structure 6*b*, 6*c* is adjusted to be relatively long, thereby providing a maximal pressing force for a given predetermined maximal pressing force of the pressing actuator arrangement 6*f*. This position of the toggle mechanism in FIG. 8*a* corresponds to the maximal stroke state of the toggle mechanism 6*e*.

Figure 9A:
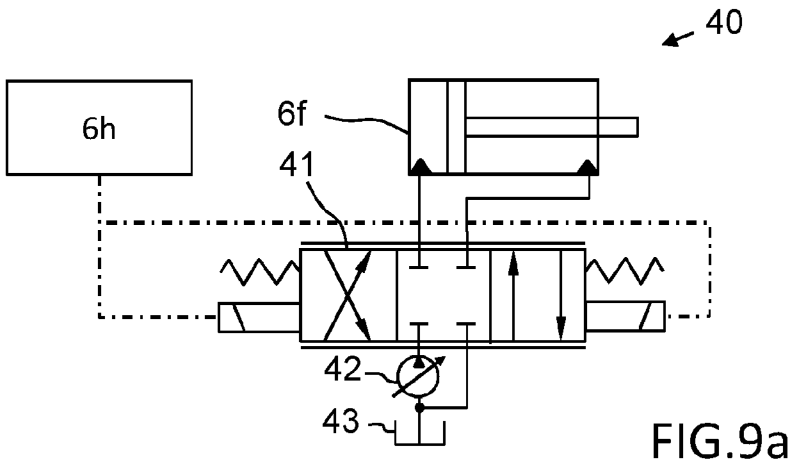
FIG. 9*a*-*c* show schematically alternative control systems of the pressing module according to the disclosure.

An example embodiment of a control system 40 suitable for controlling the toggle press 6*a* in an open loop manner is schematically illustrated in FIG. 9*a*. In this example embodiment, the pressing actuator arrangement 6*f* is a hydraulic cylinder that is fluidly controlled by a solenoid-operated directional control valve 41 that is fluidly connected to a variable displacement hydraulic pump 42 and a fluid tank 43, wherein the operating state of the directional control valve 41 may be controlled by the electronic control system 6*h*. However. The system and method according to the present disclosure is not restricted to the example embodiments described with reference to FIGS. 9*a-c*.

An alternative way for operating the toggle press 6*a* in an open loop manner may involve adjusting the distance 24 between front and rear structure 6*b*, 6*c* of the toggle press 6*a* such that the press force—mold gap curve 31* is configured to arrive at approximately operating position F*, which corresponds to target press force $PF_T$ when pressing a certain cellulose blank structure 2 and arriving at the maximal stroke state. In other words, the pressing actuator arrangement 6*f* may be controlled to simply displace the pressing member 6*d* to a maximal forward position, i.e. alignment angle of 180 degrees or maximal stroke state of the toggle mechanism 6*e*, and to have the distance 24 between front and rear structure 6*b*, 6*c* of the toggle press 6*a* adjusted beforehand such that the resulting press force equals the target press force $PF_T$.

However, for ensuring better control of the pressing operation, the electronic control system 6*h* may be configured to control the pressing operation based on feedback data from a pressing force detecting or indicating arrangement. Thereby, variations in process parameters may be better taking care of for ensuring improved quality of the cellulose products 1.

Consequently, in some example embodiments the toggle press 6*a* further includes a pressing force indicating arrangement 6*g*, wherein the electronic control system 6*h* is operatively connected to the pressing force indicating arrangement 6*g* and configured to control operation of the pressing actuator arrangement 6*f* based on pressing force indicating feedback information received from the pressing force indicating arrangement 6*g*.

The pressing force indicating arrangement 6*g* typically includes some type of measurement device for measuring a level of a parameter, such as press force, linear position of pressing member, angular position of a link member of the toggle mechanism, electric current supplies to an electric motor, hydraulic or pneumatic pressure, or the like. Consequently, the pressing force indicating feedback information typically includes, or is derived from, a measured process variable of the toggle press 6*a*.

Operational control of the pressing actuator arrangement 6*f* based on pressing force indicating feedback information received from the pressing force indicating arrangement 6*g* may for example involve press force feedback control, position feedback control, or open loop control with automatic self-tuning between consecutive pressing cycle.

The pressing force indicating arrangement may for example correspond to one or more pressing force sensors of some type being located at one or more suitable position on the pressing module 6. For example, a load cell, such as a strain gauge force sensor, or the like, may be provided at or within the forming mold 3, or between toggle mechanism 6*e* and rear structure 6*c*, or between the toggle mechanism 6*e* and the forming mold 6.

Alternatively, or in combination with above, the pressing force indicating arrangement may correspond to a deformation sensor, such as a strain gauge sensor, which is configured for sensing deformation of for example one, two or all tie bars of the intermediate linear guiding arrangement 14. Alternatively, a deformation sensor, such as a strain gauge sensor, may be provided for sensing deformation of the front structure 6*b*, or the rear structure 6*c*, or the pressing member 6*d*, or the toggle mechanism 6*e*.

Alternatively, or in combination with above, the pressing force indicating arrangement may correspond to detection of pressing force of the pressing actuator arrangement 6*f* in combination with detection position of the pressing member, because the latter may be used for calculating the current press force amplification of the toggle mechanism. Position detection of the pressing member may for example be accomplished by using a linear position encoder. Alternatively, the position of the pressing member 6*d* may be derived from the actuating position of the toggle mechanism 6*e* or the pressing actuator arrangement 6*f*. Detection of pressing force of the pressing actuator arrangement 6*f* may for example be accomplished by detecting oil or air pressure with a hydraulic or pneumatic cylinder-actuator, or by detecting current consumption or power output of a servo motor.

Figure 9B:
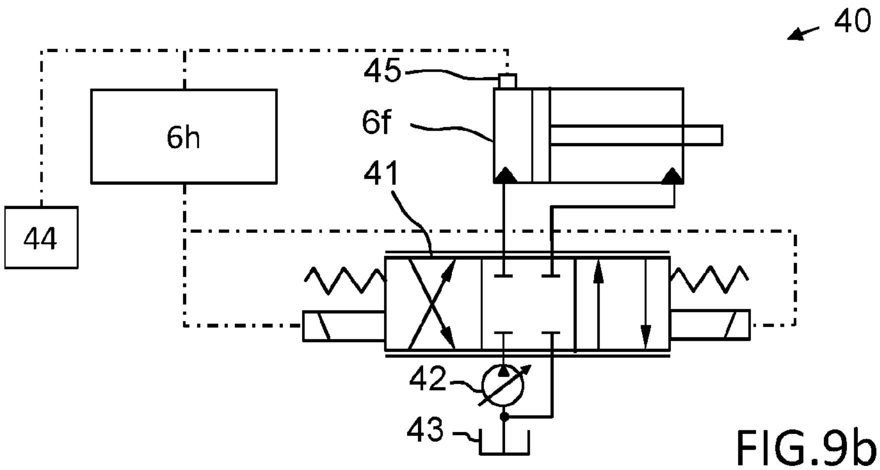

An example embodiment of a control system 40 suitable for controlling the toggle press 6*a* based on pressing force indicating feedback information received from the pressing force indicating arrangement 6*g* is schematically illustrated in FIG. 9*b*, which correspond to FIG. 9*a*, but with the addition of a pressing member position detection device 44 and pressing force detection device 45 of the pressing actuator arrangement 6*f*.

Consequently, in some example embodiments the electronic control system 6*h* is configured for obtaining pressing force indicating feedback information from the pressing force indicating arrangement 6*g*, and controlling operation of the pressing actuator arrangement 6*f* for stopping an ongoing pressing motion of the pressing member 6*d* when a value derived from or associated with the pressing force indicating feedback information is at predetermined threshold value or within a predetermined range. According to an alternative example embodiment, the electronic control system 6*h* is configured for obtaining pressing force indicating feedback information from the pressing force indicating arrangement 6*g*, and controlling operation of the pressing actuator arrangement 6*f* using a feedback controller having a parameter associated with the pressing force indicating feedback information as feedback process variable. These two example control scenarios correspond to for example the central press force-mold gap curve 31 in FIG. 7*b*.

The parameter value derived from or associated with the pressing force indicating feedback information may for example correspond to a position of the pressing member, a mold gap, thickness of cellulose product, or a pressing force, or the like.

After the pressing member 6*d* has stopped the ongoing pressing motion, the pressing member 6*d* is controlled to initiate return motion of the pressing member towards the standby position.

Specifically, when the value derived from or associated with the pressing force indicating feedback information correspond for example to a position of the pressing member, a mold gap, or a thickness of cellulose product, the pressing force indicating arrangement may be a pressing member position detection arrangement, wherein the pressing force indicating feedback information obtained from the pressing member position detection arrangement represents a position of the pressing member 6*d* or a mold gap 29 between the first and second mold parts 3*a*, 3*b*, and the electronic control system 6*h* is configured for controlling operation of the pressing actuator arrangement 6*f* for stopping an ongoing pressing motion of the pressing member when a detected position of the pressing member 6*d* or a mold gap 29 is at a predetermined threshold value or within a predetermined range. According to an alternative example embodiment, the electronic control system 6*h* is configured for using a feedback controller having a parameter associated with the pressing force indicating feedback information as feedback process variable.

The pressing member position detection arrangement may for example be a linear position encoder configured to detect the position of the pressing member 6*d*, or a position encoder for detecting the actuating position of the toggle mechanism 6*e*, or a position encoder for detecting actuating position of the pressing actuator arrangement 6*f*, or the like.

In some example embodiments, the pressing force indicating arrangement 6*g* is a pressing force detection arrangement, wherein the pressing force indicating feedback information obtained from the pressing force detection arrangement represents a pressing force of the pressing member, and the electronic control system is configured for controlling operation of the pressing actuator arrangement for stopping an ongoing pressing motion of the pressing member when a detected pressing force of the pressing member is equal to or exceeds a predetermined threshold value. According to an alternative example embodiment, the electronic control system 6*h* is configured for using a feedback controller having a parameter associated with the pressing force indicating feedback information as feedback process variable.

The pressing force indicating feedback information obtained from the pressing force detection arrangement, which may be used for representing the pressing force of the pressing member, may for example correspond to one or more pressing force sensors of some type being located at one or more suitable position on the pressing module 6, such as a load cell, a strain gauge force sensor, or the like.

The electronic control system may in some example embodiments be configured to control the adjustment actuator arrangement, for example for setting the toggle press in a more appropriate, more robust and more easily controllable operating condition, as mentioned above with reference to FIG. 7*b*, or alternatively for adjusting the maximal pressing force of the toggle press for a specific cellulose blank structure, as mentioned above with reference to FIG. 7*c*.

Consequently, the toggle press may include a pressing force indicating arrangement 6*g*, and the electronic control system may be operatively connected to the pressing force indicating arrangement 6*g*, and the control system may be configured for controlling operation of the adjustment actuator arrangement, based on pressing force indicating feedback information received from the pressing force indicating arrangement 6*g*, for adjusting the distance between the front structure and rear structure in the pressing direction, during a time period between consecutive pressing actions. As a result, the electronic control system may shift the operating position of the toggle press towards or away from the asymptotic area 35, or adjust the maximal pressing force by displacing the maximal press force curve 28 sideways in FIG. 7*b*.

This is for example accomplished by receiving pressing force indicating feedback information from the pressing force indicating arrangement 6*g* during a first pressing cycle, determining whether adjustment of the current operating position, i.e. distance 24 between the front and rear structure 6*b*, 6*c*, of the toggle press is appropriate, and if not, adjusting the distance 24 between the front and rear structure 6*b*, 6*c* by appropriate operation of the adjustment actuator arrangement 25, such that the operating position and/or pressing force during the next pressing cycle is more in line with a target operating position and/or pressing force. In other words, the electronic control system does not need active control and adjustment of the input force to the toggle mechanism 6*e* provided by the pressing actuator arrangement 6*f* for adapting the pressing force of the pressing member 6*d*, but may instead rely merely on active control of the adjustment actuator arrangement 25.

Figure 7D:
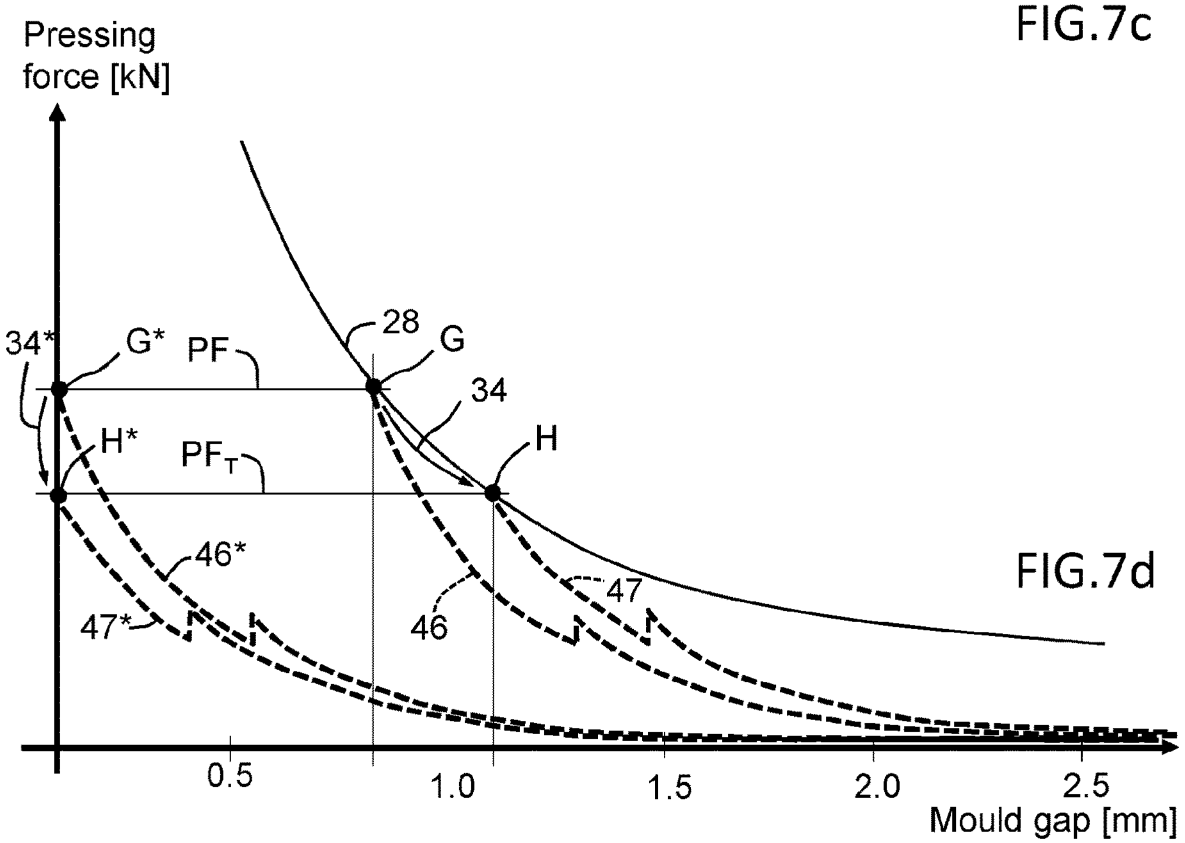

Such a control strategy is described more in detail with reference to FIG. 7*d*, wherein the electronic control system is configured for during normal running of the cellulose product toggle pressing module, controlling operation of the pressing actuator arrangement for providing a substantially fixed maximal output force to the toggle-mechanism at each pressing action. The first press force-mold gap curve 46 in FIG. 7*d* represents pressing operations during this normal running of the toggle press 6*a*. The electronic control system is further configured for obtaining pressing force indicating information from the pressing force indicating arrangement 6*g* during the pressing actions of said normal running of the toggle press 6*a*, and the pressing force indicating information indicates for example that the pressing force PF is continuously, over a set of pressing cycles, above a target pressing force $PF_T$. Consequently, the electronic control system is configured for controlling the adjustment actuator arrangement for adjusting the distance between the front structure and rear structure, during a time period between consecutive pressing actions, for maintaining a parameter value indicative of resulting maximal pressing force PF and derived from or associated with the pressing force indicating information at a predetermined threshold value or within a predetermined range.

The result of this adjustment is reflected by arrow 34 in FIG. 7*d*, wherein the distance adjustment is configured for shifting operation to follow the second press force-mold gap curve 47, i.e. slightly reducing the distance 24 for shifting operating position from G to H, for the next pressing cycle. The term "resulting maximal pressing force" herein refers to the maximal pressing force PF that was actually delivered by the pressing member 6*d* during the specific pressing action.

Alternatively, this control strategy may be implemented by adjusting the distance 24 between the front and rear structure 6*b*, 6*c*, such that the toggle pressing module 6 arrives at the target pressing force $PF_T$ simultaneously with arriving at the at maximal stroke state of the toggle mechanism 6*e*, which corresponds to operating position H* in FIG. 7*d*. In other words, the electronic control system is configured for obtaining pressing force indicating information from the pressing force indicating arrangement 6*g* during the pressing actions of said normal running of the toggle press 6*a*, which here corresponds to the first press force-mold gap curve 46* in FIG. 7*d*, and when for example the pressing force indicating information indicates that the pressing force PF is continuously, over a set of pressing cycles, above a target pressing force $PF_T$, i.e. the cellulose products 1 are formed at the operating position G*, the distance 24 between front and rear structure 6*b*, 6*c* of the toggle press 6*a* would be adjusted, during consecutive pressing actions, such that the resulting press force equals the target press force $PF_T$. The result of this adjustment is reflected by arrow 34* in FIG. 7*d*, wherein an increased distance is configured for shifting operation to follow the second press force-mold gap curve 47*, for shifting operating position from G* to H*, for the next pressing cycle.

In the control scenarios described with reference to FIG. 7*d*, wherein the pressing action is not limited by the detected pressing force or detected pressing member position, the electronic control system may be configured for controlling operation of the pressing actuator arrangement for stopping ongoing pressing action of the pressing member and initiating a return motion of the pressing member towards a starting position for example when pressing speed becomes zero, or after the pressing member has remained stationary for a certain time period, or after the parameter value indicative of the pressing force and derived from or associated with the pressing force indicating information has remained constant for a certain time period, or when the aligned position of the first and second link members 18, 19 is detected.

Furthermore, said control of the pressing actuator arrangement 6*f* for providing said substantially fixed maximal output force to the toggle-mechanism at each pressing action involves for example open loop control of the pressing actuator arrangement 6*f* to increase from about zero to a certain maximal output force, which is predetermined and fixed.

Moreover, in some example embodiments, the electronic control system 6*h* may be configured to control both the pressing actuator arrangement 6*f* and the adjustment actuator arrangement 25 based on pressing force indicating feedback information, i.e. closed loop control of both the pressing actuator arrangement 6*f* and the adjustment actuator arrangement 25. This may be accomplished by having the electronic control system 6*h* being configured for: controlling operation of the pressing actuator arrangement 6*f* for moving the pressing member 6*d* forwards while monitoring pressing force indicating feedback information from the pressing force indicating arrangement 6*g*; stopping an ongoing pressing motion of the pressing member 6*d* when a parameter value derived from or associated with the pressing force indicating feedback information is at predetermined threshold value or within a predetermined range, and initiating return motion of the pressing member 6*d*; and additionally controlling operation of the adjustment actuator arrangement 25, based on pressing force indicating feedback information received from the pressing force indicating arrangement 6*g*, for adjusting the distance 24 between the front structure and rear structure 3*b*, 3*c* in the pressing direction, during a time period between consecutive pressing actions, such that the pressing member during the next pressing cycle is targeted to become stopped at a position that has a maximal pressing force in the range of 0-100%, specifically 5-50%, above the pressing force produced when the pressing motion was stopped.

According to an alternative example embodiment, the electronic control system 6*h* may instead be configured for controlling operation of the pressing actuator arrangement 6*f* by using a feedback controller having a parameter associated with the pressing force indicating feedback information as feedback process variable.

Figure 7E:
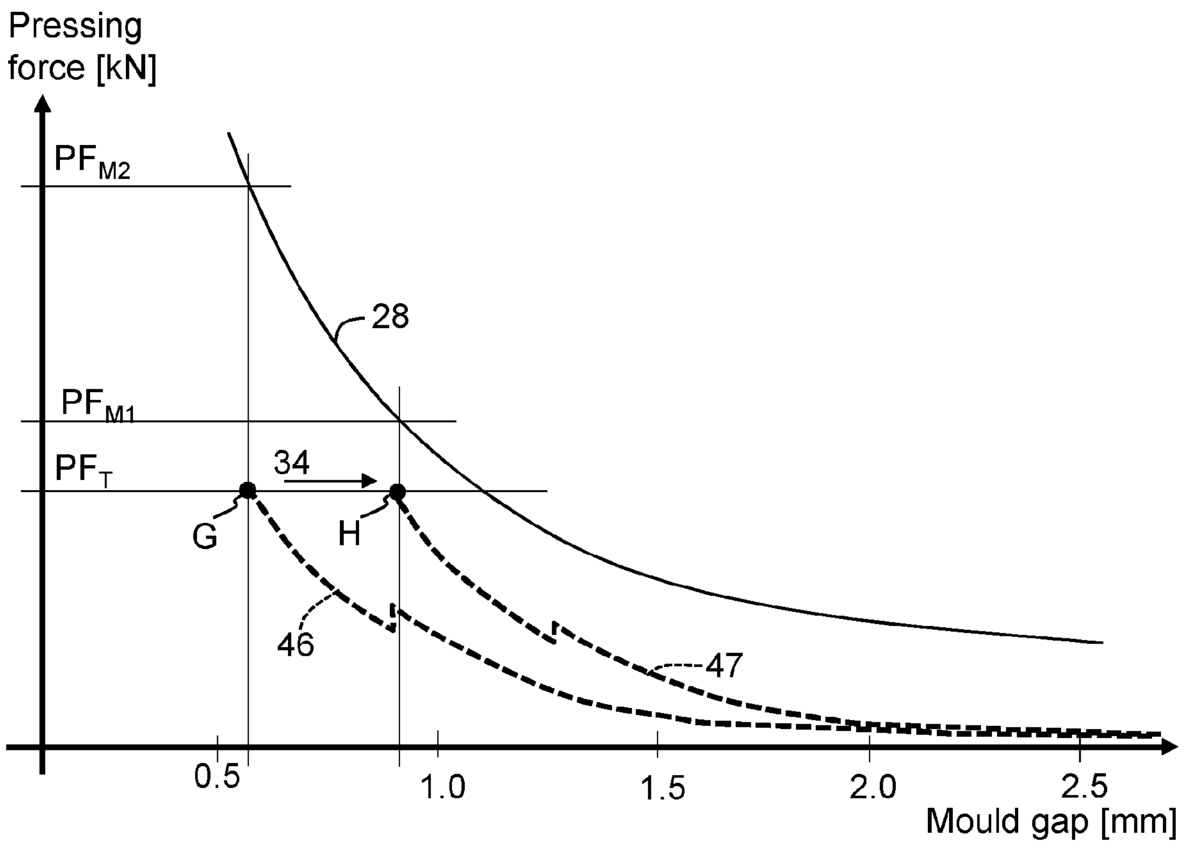

Such a control strategy is described more in detail with reference to FIG. 7*e*, wherein the electronic control system 6*h* is configured for controlling operation of the pressing actuator arrangement 6*f* for moving the pressing member 6*d* forwards while monitoring pressing force indicating feedback information from the pressing force indicating arrangement 6*g*.

The electronic control system 6*h* is further configured for stopping an ongoing pressing motion of the pressing member 6*d* when a parameter value derived from or associated with the pressing force indicating feedback information is at predetermined threshold value or within a predetermined range, and initiating return motion of the pressing member. This corresponds to operating position G in FIG. 7*e*.

The electronic control system may then be configured for evaluating the current operating position by comparing the maximal pressing force $PF_{M2}$ at the current mold gap position with the target pressing force $PF_T$ at the same mold gap position. The target pressing force $PF_T$ is typically predetermined based on the specific forming mold and cellulose blank structure, and the maximal pressing force $PF_{M2}$ may for example be estimated based on the current operating setting of the toggle press, i.e. the current distance 24 between the front and rear structures 3*a*, 3*b* and the maximal deliverable pressing force by the pressing actuator arrangement 6*f*. In FIG. 7*e*, the maximal pressing force $PF_{M2}$ is more than 100% larger than the target pressing force $PF_T$ at position G. Hence, the electronic control system may configure to shift operating position, i.e. to adjust the distance 24 between the front and rear structures 6*b*, 6*c*, to arrive at a more robust and well-controllable operating position, further away from the asymptotic area. Such adjustment of distance 24 is performed in non-loaded state, i.e. outside of the pressing action.

In other words, the electronic control system is additionally configured for controlling operation of the adjustment actuator arrangement, based on pressing force indicating feedback information received from the pressing force indicating arrangement 6*g*, for adjusting the distance 24 between the front structure and rear structure in the pressing direction, during a time period between consecutive pressing actions, such that the pressing member during the next pressing cycle is targeted to become stopped at a position H that has a maximal pressing force $PF_{M1}$ in the range of 0-100%, specifically 5-50%, above the pressing force $PF_T$ produced when the pressing motion was stopped at position G. The result of this adjustment is reflected by arrow 34 in FIG. 7*e*, wherein the distance adjustment is configured for shifting operation from the first press force-mold gap curve 46 to the second press force-mold gap curve 47, i.e. shifting operating position from G to H, for the next pressing cycle.

Figure 9C:
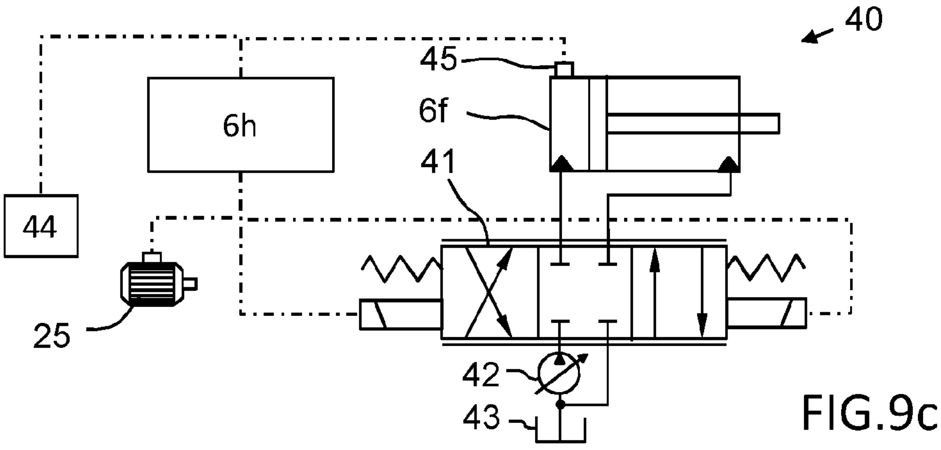

An example embodiment of a control system 40 suitable for controlling the toggle press 6*a* based on pressing force indicating feedback information received from the pressing force indicating arrangement 6*g*, as described above with reference to FIGS. 7*d* and 7*e*, is schematically illustrated in FIG. 9*c*, which correspond to FIG. 9*b*, but with the addition of the adjustment actuator arrangement 25, such as a servo motor or the like, for controlling operation of the mechanical adjustment mechanism that is used for adjusting the distance 24 between front and rear structure 6*b*, 6*c*.

The toggle pressing module 6 may further comprise an actuation motion limiting arrangement 50 configured for mechanically limiting a forwards actuation motion of the pressing member 6*d*. Specifically, in some example embodiments, the actuation motion limiting arrangement 50 is configured for mechanically preventing the toggle mechanism 6*e* from reaching its maximal stroke state, i.e. a maximal force amplification state of the toggle mechanism 6*e*. One reason for providing the toggle pressing module 6 with an actuation motion limiting arrangement 50 is to reduce the risk for unintentional over pressure of forming mold 3, because such over pressure may cause damages to the cellulose products and/or to the toggle pressing module 6.

The toggle mechanism 6*e* typically provides a highly exponential force amplification characteristic that may render a force control process of the pressing member 6*d* difficult, at least when a low-cost and reliable motion control combined with fast pressing cycle is desired. Hence, it may be desirable to be able to mechanically prevent the toggle mechanism 6*e* and/or pressing member 6*d* from displacing to a position too close to the maximal stroke state, thereby providing a pressing force limitation.

In view of the highly exponential force amplification characteristic of the toggle mechanism, the actuation motion limiting arrangement 50 may for example be configured to mechanically limit forwards motion of the pressing member 6*d* when being located in the range of 0.5-100 mm, specifically 0.5-25 mm, and more specifically 0.5-5 mm, from a position associated with the maximal stroke state of the toggle mechanism 6*e*.

Figure 15A:
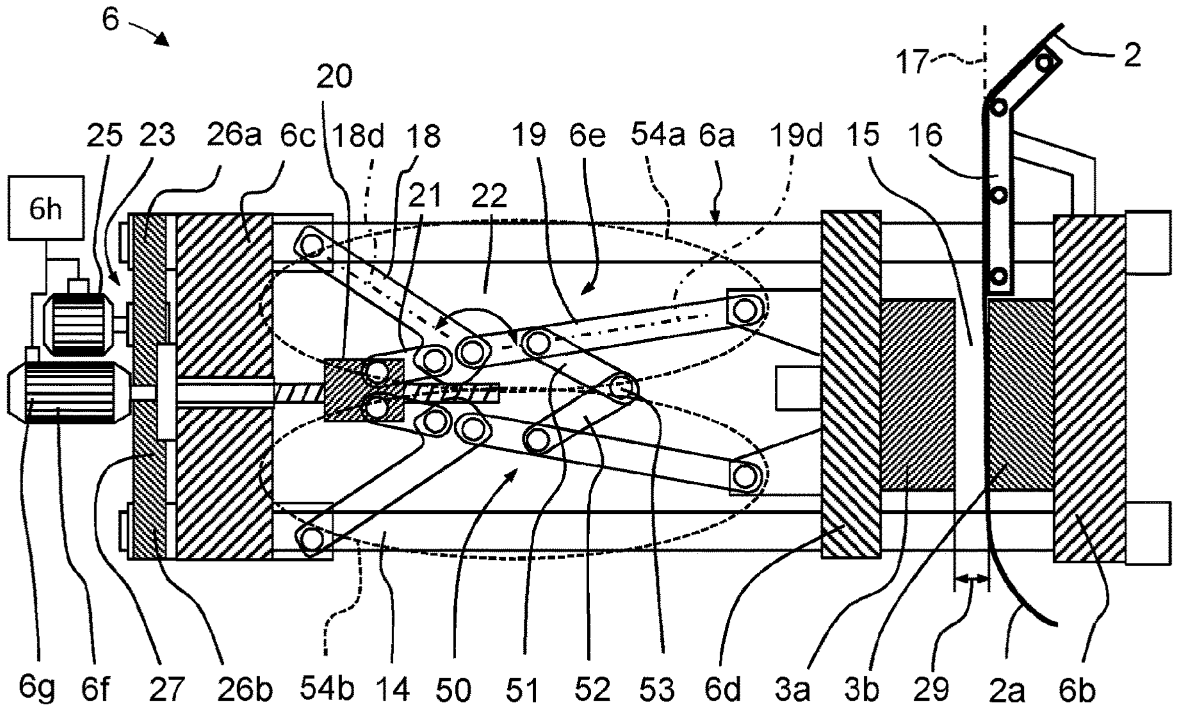
FIG. 15*a*-*b* show schematically side views of the pressing module according to a further example embodiment of the disclosure.
Figure 15B:
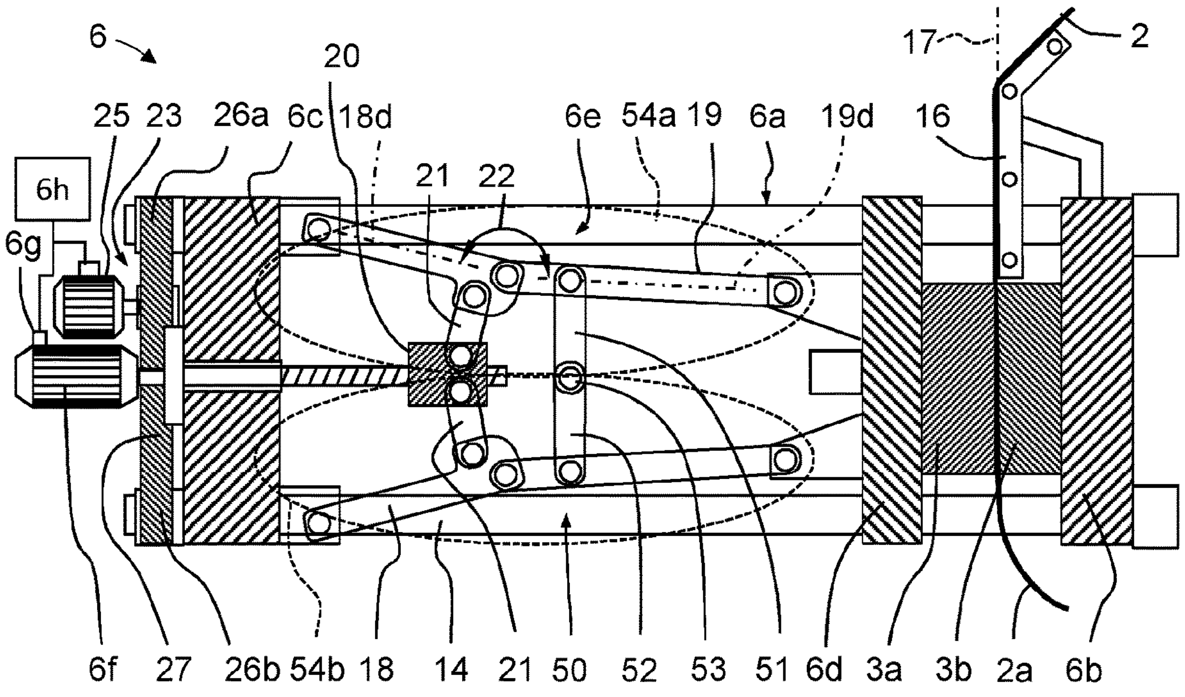

One example embodiment of a toggle pressing module 6 having an actuation motion limiting arrangement 50 configured for mechanically limiting a forwards actuation motion of the pressing member 6*d* is illustrated in FIGS. 15*a-b*, wherein FIG. 15*a* shows the toggle press 6*a* in a standby operating state and FIG. 15*b* shows the toggle press 6*a* in a maximal pressing action operating state, in which the actuation motion limiting arrangement 50 is mechanically limiting and preventing further forwards motion of the pressing member 6*d*.

The toggle pressing module 6 schematically illustrated in FIGS. 15*a-b* corresponds to the toggle pressing module 6 described above with reference to FIGS. 3*a-b* and reference is made to the disclosure relating to FIG. 3*a-b* for details of the toggle pressing module 6, except for the adjustment actuator arrangement 25 that here is schematically implemented as an electrically-powered ball-screw linear actuator. The ball-screw linear actuator may for example comprise a rod drivingly connected to an electric motor and having a helical track for holding rolling balls that may circulate in a track in the cross head 20.

In the example embodiment of FIGS. 15*a-b*, the toggle press 6*a* includes a five-point double-toggle mechanism 6*e* having first and second individual toggle mechanisms 54*a*, 54*b* arranged side-by-side, wherein the actuation motion limiting arrangement 50 comprises a first limiting link 51 that is pivotally connected to a second link member 19 of the first individual toggle mechanism 54*a* and a second limiting link 52 that is pivotally connected to a second link member 19 of the second individual toggle mechanism 54*b*, and wherein the first and second limiting links 51, 52 are mutually pivotally connected at a common pivot joint 53.

The length, size and form of the first and second limiting links 51, 52, as well as their connection points to the second link members 19 of the first and second individual toggle mechanism 54*a*, 54*b*, are selected to mechanically prevent the toggle mechanism 6*e* from fully reaching the maximal stroke state, i.e. maximal extended state.

The length of at least one of the first and second limiting links 51, 52, and/or the position of at least one of the connection points between the first and second limiting links 51, 52 and the second link members 19 of the first and second individual toggle mechanism 54*a*, 54*b* may be adjustable for enabling adjustment of the actuation motion length, thereby providing a more flexible toggle pressing module 6*e*.

Many alternative designs of the actuation motion limiting arrangement 50 are possible, depending on for example the selected design of the toggle mechanism 6*e* and selected design of the adjustment actuator arrangement 25. For example, the actuation motion limiting arrangement 50 may comprise a flexible wire or belt instead of two pivoting links. Furthermore, in some example embodiments, the actuation motion limiting arrangement 50 is implemented by mechanically restricting the angular motion range of one or more link members 18, 19, 21 of the toggle mechanism 6*e*, or by mechanically restricting the actuation motion length of the adjustment actuator arrangement 25.

Figure 10:
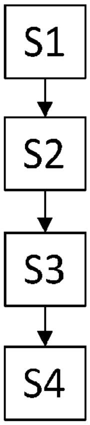
FIG. 10-14 show schematically some basic steps of various methods according to the disclosure.

The basic steps of the method for forming non-flat cellulose products from an air-formed cellulose blank structure is described below with reference to FIG. 10. The method comprises a first step S1 of providing a cellulose product toggle pressing module 6 having a toggle press 6*a* and a forming mold 3, wherein the toggle press 6*a* includes a pressing member 6*d* movably arranged in a pressing direction, a toggle-mechanism 6*e* connected to the pressing member 6*d*, a pressing actuator arrangement 6*f* connected to the toggle-mechanism, and an electronic control system 6*h* operatively connected to the pressing actuator arrangement, and wherein the forming mold includes a moveable first mold part 3*a* attached to the pressing member and a stationary second mold part 3*b*.

The method further comprises a second step S2 of installing the toggle press 6*a* with the pressing direction of the pressing member arranged primarily in a horizontal direction, specifically with the pressing direction of the pressing member arranged within 20 degrees from the horizontal direction, and more specifically with the pressing direction in parallel with the horizontal direction.

In addition, the method comprises a third step S3 of feeding an air-formed cellulose blank structure 2 into a pressing area defined by the first and second, spaced apart, mold parts.

Finally, the method comprises a fourth step S4 of controlling operation of the pressing actuator arrangement 6*f* by means of the electronic control system 6*h* for driving the pressing member using the toggle-mechanism in the pressing direction and forming the non-flat cellulose product from the air-formed cellulose blank structure by pressing the first mold part against the stationary second mold part.

Said fourth step S4 of controlling operation of the pressing actuator arrangement 6*f* may be performed a many different ways while still solving the problem of forming non-flat cellulose products from an air-formed cellulose blank structure using a low-cost, compact and low-weight cellulose product pressing module.

Figure 11:
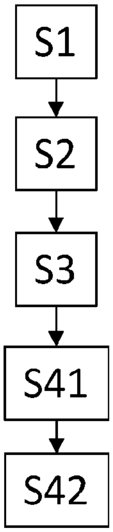

For example, one more detailed example embodiment for performing said fourth step S4 is described below with reference to FIG. 11, wherein steps S1-S3 are the same as described with reference to FIG. 10. Specifically, the fourth step S4 of controlling operation of the pressing actuator arrangement 6*f* by means of an electronic control system 6*h* may involve a first substep S41 of obtaining pressing force indicating feedback information from the pressing force indicating arrangement 6*g*, and a second substep S42 of controlling operation of the pressing actuator arrangement 6*f* for stopping an ongoing pressing motion of the pressing member 6*d* when a parameter value derived from or associated with the pressing force indicating feedback information is at predetermined threshold value or within a predetermined range.

Figure 12:
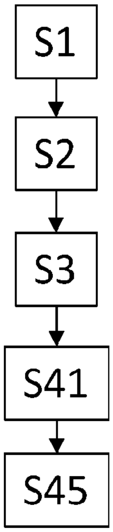

A further example embodiment for performing said fourth step S4 is described below with reference to FIG. 12, wherein steps S1-S3 are the same as described with reference to FIG. 10, and the fourth step S4 of controlling operation of the pressing actuator arrangement 6*f* by means of an electronic control system 6*h* may involve a first substep S41 of obtaining pressing force indicating feedback information from the pressing force indicating arrangement 6*g*, and a second substep S45 of controlling operation of the pressing actuator arrangement 6*f* using a feedback controller having a parameter associated with the pressing force indicating feedback information as feedback process variable.

The feedback controller may be implemented in a variety of alternative ways, as known to the person skilled in the art, such as for example a P controller, PI controller, PID controller, Optimal control, such as for example Linear Quadratic (LQ) controller, or the like.

For example, a PID (Proportional-Integral-Derivative) controller is a control loop mechanism employing feedback for providing a continuously modulated control of the process to be controlled. A feedback controller, such as for example a PID controller, continuously calculates an error value as the difference between a desired setpoint (SP) and a measured process variable (PV) and applies a correction based on proportional, integral, and derivative terms of said error value. The setpoint (SP) may for example be a specific predetermined compression force-time curve and the measured process variable (PV) may for example be measured pressing force as detected by a strain gauge force sensor located on a tie bar 37 of the toggle press 6*a*.

Figure 13:
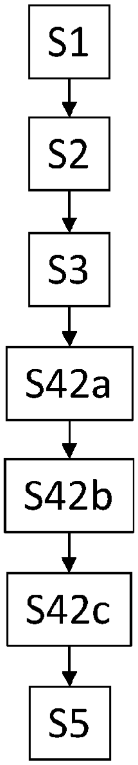

The basic steps of still an example embodiment the method for forming non-flat cellulose products from an air-formed cellulose blank structure is described below with reference to FIG. 13, wherein steps S1-S3 are the same as described with reference to FIG. 10, and the fourth step S4 of controlling operation of the pressing actuator arrangement 6*f* by means of an electronic control system 6*h* may involve a first substep S42*a* of controlling operation of the pressing actuator arrangement 6*f* by moving the pressing member 6*d* forwards while monitoring pressing force indicating feedback information from the pressing force indicating arrangement 6*g*); a second substep S42*b* of stopping an ongoing pressing motion of the pressing member 6*d* when a parameter value derived from or associated with the pressing force indicating feedback information is at predetermined threshold value or within a predetermined range, and a third substep S42*c* of initiating return motion of the pressing member 6*d*). The method may then involve a fifth step S5 of controlling operation of the adjustment actuator arrangement 25, based on pressing force indicating feedback information received from the pressing force indicating arrangement 6*g*, for adjusting the distance 24 between the front structure and rear structure 6*b*, 6*c* in the pressing direction, during a time period between consecutive pressing actions, such that the pressing member 6*d* during the next pressing cycle is targeted to become stopped at a position that has a maximal pressing force in the range of 0-100%, specifically 5-50%, above the pressing force produced when the pressing motion was stopped.

The forwards motion of the pressing member 6*d* in the example embodiments described with reference to for example FIGS. 11 and 13 may be performed in a variety of ways. For example, the pressing actuator arrangement 6*f* be controlled using an on/off regulator for moving the pressing member 6*d* forwards, meaning that the pressing actuator arrangement 6*f* is simply operated at a certain power level or speed until said parameter value is at the predetermined threshold value or within the predetermined range. Alternatively, the pressing actuator arrangement 6*f* be controlled using an on/off regulator combined with a variable power or speed for moving the pressing member 6*d* forwards, meaning that the pressing actuator arrangement 6*f* is operated for example with a gradual and/or stepwise reduced speed during the forwards motion until said parameter value is at the predetermined threshold value or within the predetermined range. A gradual and/or stepwise reduced speed of the pressing actuator arrangement 6*f* may enable a more accurate and reliable forming process, because the risk for overshooting the pressing force is reduced. In both said alternative control methods, the pressing actuator arrangement 6*f* may be controlled using an open loop controller for moving the pressing member 6*d* forwards.

Figure 14:
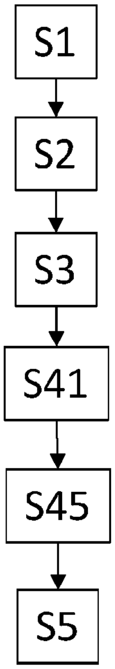

The basic steps of still an example embodiment the method for forming non-flat cellulose products from an air-formed cellulose blank structure is described below with reference to FIG. 14, wherein steps S1-S3 are the same as described with reference to FIG. 10, and the fourth step S4 of controlling operation of the pressing actuator arrangement 6*f* by means of an electronic control system 6*h* may involve a first substep S41 of obtaining pressing force indicating feedback information from the pressing force indicating arrangement 6*g*, and a second substep S45 of controlling operation of the pressing actuator arrangement 6*f* using a feedback controller having a parameter associated with the pressing force indicating feedback information as feedback process variable.

The method may then involve a fifth step S5 of controlling operation of the adjustment actuator arrangement 25, based on pressing force indicating feedback information received from the pressing force indicating arrangement 6*g*, for adjusting the distance 24 between the front structure and rear structure 6*b*, 6*c* in the pressing direction, during a time period between consecutive pressing actions, such that the pressing member 6*d* during the next pressing cycle is targeted to become stopped at a position that has a maximal pressing force in the range of 0-100%, specifically 5-50%, above the pressing force produced when the pressing motion was stopped.

With reference to the toggle pressing module 6 and method described above in connection with FIGS. 1*a*-15*b*, the present disclosure also relates to a cellulose product toggle pressing module for forming non-flat cellulose products from an air-formed cellulose blank structure that is not restricted to a particular angular orientation of the toggle pressing module 6, but instead includes a pressing force indicating arrangement 6*g*, wherein the electronic control system is configured for controlling operation of pressing actuator arrangement, based on pressing force indicating feedback received from the pressing force indicating arrangement 6*g*.

In other words, the disclosure also relates to a toggle pressing module 6 comprising a toggle press 6*a* including pressing member 6*d* movably arranged in a pressing direction, a toggle-mechanism 6*e* drivingly connected to the pressing member 6*d*, a pressing actuator arrangement 6*f* drivingly connected to the toggle-mechanism 6*e*, a pressing force indicating arrangement 6*g*, and an electronic control system 6*h* operatively connected to the pressing actuator arrangement 6*f* and to the pressing force indicating arrangement 6*g*. The toggle pressing module 6 further comprises a forming mold 3 including a moveable first mold part 3*a* attached to the pressing member 3*d* and a stationary second forming mold 3*b*. The electronic control system 6*h* is configured for controlling operation of pressing actuator arrangement 6*f*, based on pressing force indicating feedback received from the pressing force indicating arrangement 6*g*, for driving the pressing member using the toggle-mechanism 6*e* in the pressing direction and forming the non-flat cellulose product from the air-formed cellulose blank structure by pressing the first mold part against the stationary second mold part.

Similarly, the present disclosure also relates to method for forming non-flat cellulose products from an air-formed cellulose blank structure having to following step: providing a cellulose toggle pressing module 6 having a toggle press 6*a* and a forming mold 3, wherein the toggle press 6*a* includes a pressing member 6*d* movably arranged in a pressing direction, a toggle-mechanism 6*e* drivingly connected to the pressing member 6*d*, a pressing actuator arrangement 6*f* drivingly connected to the toggle-mechanism 6*e*, a pressing force indicating arrangement 6*g*, and an electronic control system 6*h* operatively connected to the pressing actuator arrangement 6*f* and to the pressing force indicating arrangement 6*g*, and wherein the forming mold 3 includes a moveable first mold part 3*a* attached to the pressing member 6*d* and a second forming mold part 3*b*. The method further comprises the steps of feeding an air-formed cellulose blank structure 2 into a pressing area defined by the first and second, spaced apart, mold parts 3*a*, 3*b*, and controlling operation of pressing actuator arrangement 6*f* by means of the electronic control system 6*h* based on pressing force indicating feedback information received from the pressing force indicating arrangement 6*g*, for driving the pressing member 6*d* using the toggle-mechanism 6*e* in the pressing direction and forming the non-flat cellulose product 1 from the air-formed cellulose blank structure 2 by pressing the first mold part 3*a* against the second mold part 3*b*.

The use of a toggle pressing module for forming non-flat cellulose products from an air-formed cellulose blank structure has many advantages over use of large-capacity conventional toggle-less hydraulic presses, such as low-cost, low-weight, fast cycle operation and compactness. Consequently, the toggle pressing module 6 may in certain circumstances be a useful alternative to a conventional hydraulic press, and by having the electronic control system configured for controlling operation of pressing actuator arrangement, based on pressing force indicating feedback information received from the pressing force indicating arrangement 6*g*, better force control of the forming operation may be accomplished. The example embodiments of a method for forming a non-flat cellulose products from an air-formed cellulose blank structure described with reference to FIGS. 10-14 are still relevant for this example embodiment of the disclosure when omitting the second step S2 of installing the toggle press 6*a* with the pressing direction of the pressing member arranged primarily in a horizontal direction.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Moreover, features of the example embodiments described herein may be combined with features of other example embodiments described herein. For example, the toggle pressing module of FIG. 3*a*-*b* may be provided with a toggle mechanism as describe with reference to 2*a*, 6*a*, 6*b*, 8*a* or 15*a*, or an adjustment actuator arrangement 25 as described with reference to FIG. 6*a*, 6*b* or 15*a*. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A cellulose product toggle pressing module for forming non-flat cellulose products from an air-formed cellulose blank structure, the toggle pressing module comprising:

a toggle press including a pressing member movably arranged in a pressing direction, a toggle-mechanism drivingly connected to the pressing member, a pressing actuator arrangement drivingly connected to the toggle-mechanism, and an electronic control system operatively connected to the pressing actuator arrangement, and a forming mold including a moveable first mold part attached to the pressing member and a second mold part, wherein the electronic control system is configured for controlling operation of pressing actuator arrangement for driving the pressing member using the toggle-mechanism in the pressing direction and forming the non-flat cellulose product from the air-formed cellulose blank structure by pressing the first mold part against the second mold part, and wherein the toggle press is installed with, or arranged for being installed with, the pressing direction of the pressing member arranged primarily in a horizontal direction, wherein the toggle press further includes a front structure and a rear structure, wherein the toggle-mechanism is connected to the rear structure, wherein the second mold part is attached to the front structure, and wherein the toggle press further includes a mechanical adjustment mechanism for enabling adjustment of a distance between the front structure and rear structure in the pressing direction, and an adjustment actuator arrangement configured for driving the mechanical adjustment mechanism, wherein the toggle press further includes a pressing force indicating arrangement, wherein the electronic control system is operatively connected to the pressing force indicating arrangement, and wherein the control system is configured for controlling operation of the adjustment actuator arrangement, based on pressing force indicating feedback information received from the pressing force indicating arrangement, for adjusting the distance between the front structure and rear structure in the pressing direction, during a time period between consecutive pressing actions.

2. The cellulose product toggle pressing module according to claim 1, wherein the toggle press further includes a feeding device for feeding the air-formed cellulose blank structure into a pressing area located between the first and second mold parts, wherein the feeding device is arranged for feeding the air-formed cellulose blank structure primarily vertically downwards into the pressing area; and wherein the forming mold is configured for forming the cellulose products from the cellulose blank structure by heating the cellulose blank structure to a forming temperature in the range of 100-300° C., and pressing the cellulose blank structure with a forming pressure in the range of 1-100 MPa.

3. The cellulose product toggle pressing module according to claim 1, wherein the electronic control system is configured for obtaining pressing force indicating feedback information from the pressing force indicating arrangement, and controlling operation of the pressing actuator arrangement:

for stopping an ongoing pressing motion of the pressing member when a parameter value derived from or associated with the pressing force indicating feedback information is at predetermined threshold value or within a predetermined range; or using a feedback controller having a parameter associated with the pressing force indicating feedback information as feedback process variable.

4. The cellulose product toggle pressing module according to claim 1, wherein the electronic control system is configured for:

controlling operation of the pressing actuator arrangement for either moving the pressing member forwards while monitoring pressing force indicating feedback information from the pressing force indicating arrangement and subsequently stopping an ongoing pressing motion of the pressing member when a parameter value derived from or associated with the pressing force indicating feedback information is at predetermined threshold value or within a predetermined range, and thereafter initiating return motion of the pressing member, or using a feedback controller having a parameter associated with the pressing force indicating feedback information as feedback process variable, and controlling operation of the adjustment actuator arrangement, based on pressing force indicating feedback information received from the pressing force indicating arrangement, for adjusting the distance between the front structure and rear structure in the pressing direction, during a time period between consecutive pressing actions, such that the pressing member during the next pressing cycle is targeted to become stopped at a position that has a maximal pressing force in the range of 0-100% above the pressing force produced when the pressing motion was stopped.

5. The cellulose product toggle pressing module according to claim 1, wherein the electronic control system is configured for:

during normal running of the cellulose product toggle pressing module, controlling operation of the pressing actuator arrangement for providing a substantially fixed output force to the toggle-mechanism at each pressing action, obtaining pressing force indicating information from the pressing force indicating arrangement during pressing actions, controlling the adjustment actuator arrangement for adjusting the distance between the front structure and rear structure, during a time period between consecutive pressing actions, for maintaining a parameter value indicative of resulting maximal pressing force and derived from or associated with the pressing force indicating information at a predetermined threshold value or within a predetermined range.

6. The cellulose product toggle pressing module according to claim 1, wherein each of the first and second mold parts comprises a main rigid plate-shaped body with a surface configured for facing the other mold part, and at least one pressing surface defining one or more forming cavities for forming a cellulose product, and with or without additional minor parts, such as spring-loaded cutting devices and/or mold alignment devices, wherein said surfaces of the main rigid plate-shaped body of the first and second mold forming parts are free from mutual direct contact during a pressing cycle.

7. A product forming unit for manufacturing non-flat cellulose products from an air-formed cellulose blank structure, wherein the product forming unit comprises a buffering module and a toggle pressing module according to claim 1, wherein the product forming unit is adapted for feeding the cellulose blank structure to the buffering module, buffering the cellulose blank structure, in the buffering module, and feeding the cellulose blank structure from the buffering module to the toggle pressing module, and wherein the buffering module comprises a blank feeding system configured for continuously feeding the cellulose blank structure to the buffering module in a first feeding direction, and intermittently feeding the cellulose blank structure from the buffering module in a second feeding direction, wherein the second feeding direction differs from the first feeding direction.

8. The product forming unit according to claim 7, wherein the product forming unit further comprises a blank dry-forming module configured for providing the cellulose blank structure.

9. The product forming unit according to claim 8, wherein the blank dry-forming module comprises a mill, a forming chamber, and a forming wire arranged in connection to the forming chamber, wherein the mill is configured for separating fibers from a cellulose raw material, wherein the forming chamber is configured for distributing the separated fibres onto a forming section of the forming wire for forming the cellulose blank structure.

10. The product forming unit according to claim 9, wherein the forming section is extending in an upwards blank forming direction.

11. The cellulose product toggle pressing module according to claim 1, wherein the toggle press further includes a pressing force indicating arrangement, wherein the electronic control system is operatively connected to the pressing force indicating arrangement and configured to control operation of the pressing actuator arrangement based on pressing force indicating feedback information received from the pressing force indicating arrangement.

* * * * *